United States Patent
Wang et al.

(10) Patent No.: US 10,353,167 B2
(45) Date of Patent: Jul. 16, 2019

(54) CAMERA LENS MODULE WITH ONE OR MORE OPTICAL LENS MODULES AND MANUFACTURING METHOD THEREOF

(71) Applicant: NINGBO SUNNY OPOTECH CO., LTD., Ningbo, Zhejiang (CN)

(72) Inventors: Mingzhu Wang, Ningbo (CN); Heng Jiang, Ningbo (CN); Feifan Chen, Ningbo (CN); Chunmei Liu, Ningbo (CN); Bojie Zhao, Ningbo (CN); Nan Guo, Ningbo (CN); Liang Ding, Ningbo (CN)

(73) Assignee: Ningbo Sunny Opotech Co., Ltd., Ningbo, Zhejiang (CN)

( * ) Notice: Subject to any disclaimer, the term of this patent is extended or adjusted under 35 U.S.C. 154(b) by 0 days.

(21) Appl. No.: 15/784,166

(22) Filed: Oct. 15, 2017

(65) Prior Publication Data
US 2018/0106978 A1   Apr. 19, 2018

Related U.S. Application Data

(63) Continuation of application No. 15/057,050, filed on Feb. 29, 2016.

(51) Int. Cl.
| | |
|---|---|
| *H04N 5/225* | (2006.01) |
| *G02B 7/00* | (2006.01) |
| *G02B 7/02* | (2006.01) |
| *H04N 17/00* | (2006.01) |

(52) U.S. Cl.
CPC ............... *G02B 7/003* (2013.01); *G02B 7/02* (2013.01); *G02B 7/021* (2013.01); *G02B 7/023* (2013.01); *H04N 5/2253* (2013.01); *H04N 5/2254* (2013.01); *H04N 5/2257* (2013.01); *H04N 17/002* (2013.01)

(58) Field of Classification Search
CPC .. H04N 5/2254; H04N 5/2257; H04N 5/2253; G02B 7/02–7/16; G02B 7/003–7/005
See application file for complete search history.

(56) References Cited

U.S. PATENT DOCUMENTS

| | | | |
|---|---|---|---|
| 2003/0057426 A1* | 3/2003 | Miyazaki | H01L 27/14618 257/88 |
| 2004/0252195 A1* | 12/2004 | Lu | G02B 7/02 348/188 |
| 2005/0237415 A1* | 10/2005 | Kong | G02B 7/022 348/335 |

(Continued)

*Primary Examiner* — Abdelaaziz Tissire
(74) *Attorney, Agent, or Firm* — Raymond Y. Chan; David and Raymond Patent Firm

(57) ABSTRACT

A camera lens module includes an image sensor and a lens assembly. The image sensor includes a photosensitive chip defining a photosensitive path, wherein the lens assembly is coupled to the image sensor along the photosensitive path of the photosensitive chip. The lens assembly includes at least one optical lens module and an aperture member coupled at the optical lens module, wherein the optical lens module includes a lens barrel and at least an optical lens supported within the lens barrel. A relative position of the lens assembly with respect to the image sensor is adjustable for calibration and the relative position of the optical lens module is permanently fixed after calibration.

12 Claims, 10 Drawing Sheets

(56) References Cited

U.S. PATENT DOCUMENTS

| | | | | |
|---|---|---|---|---|
| 2006/0192230 A1* | 8/2006 | Wood | H01L 27/14618 | 257/234 |
| 2009/0015706 A1* | 1/2009 | Singh | G03B 17/00 | 348/340 |
| 2009/0167880 A1* | 7/2009 | Yang | G03B 15/03 | 348/218.1 |
| 2009/0185296 A1* | 7/2009 | Huang | G02B 7/021 | 359/819 |
| 2010/0265597 A1* | 10/2010 | Shyu | C03B 11/08 | 359/797 |
| 2011/0026144 A1* | 2/2011 | Shyu | B29C 43/18 | 359/819 |
| 2011/0058265 A1* | 3/2011 | Chang | G02B 13/004 | 359/793 |
| 2013/0063655 A1* | 3/2013 | Hsu | G02B 7/021 | 348/374 |
| 2013/0242182 A1* | 9/2013 | Rudmann | G02B 7/021 | 348/374 |
| 2014/0043524 A1* | 2/2014 | Azuma | H04N 5/232 | 348/357 |
| 2014/0125849 A1* | 5/2014 | Heimgartner | H01L 27/14625 | 348/276 |
| 2015/0062422 A1* | 3/2015 | Stern | H04N 5/2254 | 348/374 |
| 2015/0172521 A1* | 6/2015 | Yasukochi | H04N 5/2252 | 348/373 |

* cited by examiner

CAMERA LENS MODULE WITH ONE OR MORE OPTICAL LENS MODULES AND MANUFACTURING METHOD THEREOF

CROSS REFERENCE OF RELATED APPLICATION

This is a Continuation application that claims the benefit of priority under 35 U.S.C. § 120 to a non-provisional application, application Ser. No. 15/057,050, filed Feb. 29, 2016. The afore-mentioned patent application is hereby incorporated by reference in their entirety.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to photographic cameras, and more particularly to a camera lens module and a manufacturing method thereof.

Description of Related Arts

With the rapid development of mobile communication technologies, camera modules have become a standardized equipment for electronic apparatus such as smart phones, portable computers, tablet computers, televisions, vehicle monitoring systems, and surveillance systems. Accordingly, the camera module has been rapidly developed toward major concerns of how to improve the production yield and efficiency, how to reduce the cost, and how to improve the image capturing quality. An existing camera module generally comprises a circuit board, a light sensor chip, a lens base, a driver unit, a lens, and other major components being assembled together, wherein the resolution of the camera module can achieve through the image quality control by the circuit board, the light sensor chip, the lens and the driver unit, the tolerance of the structural configuration of the components, and the tolerance of the assembling configuration of the components.

Within all major components of the camera module, the camera lens is the most important factor to affect the image resolution. Under normal circumstances, the camera module is configured to include one or more lenses in an individual lens assembly. In particular, the camera lens comprises a lens barrel to support a plurality of lenses therein to provide a dark environment therefor, wherein two or more lens barrels are assembled together to correlatively link the lenses form an integral optical system. Then, the optical system is assembled to the lens base or the driver unit. Through the assembling process, assembly errors may cause the lens eccentrically or tiltedly aligned with the light sensor chip, so as to reduce the resolution of the camera module. Furthermore, the tolerance of each lens related to its optical ability and the tolerance of each lens to be mounted in the lens barrel should take into account of the conventional assembling process. Even though the quality of each lens can be guaranteed and each lens can be precisely installed into the lens barrel, the tolerance of assembling the lens barrels together will also take into account of the conventional assembling process. It is because the assembling tolerance of the lens assembly cannot be corrected once the lens barrels are assembled. In other words, these tolerances will reduce the optical quality of the lens assembly and affect the productivity and image quality of the lens assembly. Therefore, there is a demand for improving the existing assembling process of the lens assembly to ensure the image quality thereof.

SUMMARY OF THE PRESENT INVENTION

The invention is advantageous in that it provides a camera lens module with one or more optical lens modules and a manufacturing method thereof, which can eliminate the defects of the conventional camera lens module during the assembling process. The assembling process and the calibration process can be integrated into the manufacturing process to ensure the image quality of the camera lens module.

Another advantage of the invention is to a camera lens module with one or more optical lens modules and a manufacturing method thereof, wherein the position adjustment and the calibration are completed before the final assembling of the camera lens to simplify the assembling steps of the camera lens module, to highly increase the production efficiency of the camera lens module, and to reduce the manufacturing cost of the camera lens module.

Another advantage of the invention is to a camera lens module with one or more optical lens modules and a manufacturing method thereof, wherein the calibration of the camera lens module is based on the image quality thereof to adjust the relative position of the lens barrel so as to ensure the higher product yield of the camera lens module.

Another advantage of the invention is to a camera lens module with one or more optical lens modules and a manufacturing method thereof, wherein the camera lens module comprises a plurality of optical lens modules, each comprising at least one optical lens supported in a lens barrel. The relative position of each optical lens modules is adjustable to ensure the corrected alignment of the optical lens module so as to ensure the optical quality of the camera lens module.

Another advantage of the invention is to a camera lens module and a manufacturing method thereof, wherein the calibration of the camera lens module with one or more optical lens modules is to adjust the relative positions of the optical lens modules to compensate the unavoidable tolerance of the camera lens module so as to minimize the optical defect of camera lens module and to enhance the production efficiency while being cost effective.

Another advantage of the invention is to a camera lens module with one or more optical lens modules and a manufacturing method thereof, the relative position of the optical lens module is permanently fixed once the calibration thereof is completed to minimize the assembling steps of the camera lens module while being cost effective.

Another advantage of the invention is to a camera lens module with one or more optical lens modules and a manufacturing method thereof, wherein the structural configuration of the camera lens module is compact to reduce the overall size thereof.

Another advantage of the invention is to a camera lens module with one or more optical lens modules and a manufacturing method thereof, wherein the relative position of the optical lens module is adjustable with respect to as many as six axes X, Y, Z, U, V, W thereof.

Another advantage of the invention is to a camera lens module with one or more optical lens modules and a manufacturing method thereof, wherein each optical element to be calibrated can be selectively adjusted at different orientations to speed up the calibration process and to ensure the image quality and precise assembly of the camera lens module.

Another advantage of the invention is to a camera lens module with one or more optical lens modules and a manufacturing method thereof, which can minimize the existing assembling tolerances through the conventional assembling method of the camera lens module so as to reduce the defect of the camera lens module due to the conventional assembling method.

Another advantage of the invention is to a camera lens module with one or more optical lens modules and a manufacturing method thereof, wherein the relative position of at least one of the optical lens module is adjustable to ensure the image quality of the camera lens module.

Another advantage of the invention is to a camera lens module with one or more optical lens modules and a manufacturing method thereof, wherein each optical element to be calibrated is calibrated and adjusted for achieving the desired image quality of the camera lens module before the relative position of the optical element to be calibrated is fixed.

Another advantage of the invention is to a camera lens module with one or more optical lens modules and a manufacturing method thereof, the calibration process can apply to adjust the relative position of the optical lens, the relative position of the optical lens module, and the relative position of the aperture member. Therefore, the calibration process can be selectively applied any combination of different optical element to be calibrated optical elements to be calibrated to ensure the image quality of the camera lens module.

Additional advantages and features of the invention will become apparent from the description which follows, and may be realized by means of the instrumentalities and combinations particular point out in the appended claims.

According to the present invention, the foregoing and other objects and advantages are attained by a camera lens module, comprising:

an image sensor having a photosensitive path; and a lens assembly, which comprises an optical lens set, a lens barrel set, and an aperture member, wherein the optical lens set comprises at least one optical lens, wherein the lens barrel set comprises at least one lens barrel, wherein the optical lens is supported within the lens barrel along a height direction thereof to form at least an optical lens module, wherein the aperture member is coupled at a distal edge of the optical lens module, wherein the optical lens module is coupled at the image sensor along the photosensitive path thereof, wherein an assembling position of at least one of the optical lens modules is adjustable with respect to the position of the image sensor.

In one embodiment, the lens assembly comprises two or more optical lens modules, wherein two adjacent optical lens modules are pre-assembled such that the assembling position of each of the optical lens modules is adjustable with respect to the position of the image sensor.

In one embodiment, the relative position of the optical lens module is adjustable with respect to as many as the six axes X, Y, Z, U, V, W of the camera lens module.

In one embodiment, at least one of the lenses of the optical lens modules is pre-assembled in the respective lens barrel while the assembling position of the pre-assembled lens is arranged to be adjustable with respect to the position of the image sensor.

In particular, the optical lens is arranged movable within the lens barrel to selectively adjust the assembling position of the optical lens within the lens barrel in at least one direction.

In one embodiment, a calibration channel is formed at a barrel wall of the lens barrel communicating an interior thereof with outside and is aligned with respect to the optical lens pre-assembled within the lens barrel, such that the assembling position of the optical lens within the lens barrel can be adjusted through the calibration channel.

In one embodiment, the aperture member is coupled at the top portion of the optical lens module, wherein the relative position of the aperture member with respect to the optical lens module is adjustable.

In one embodiment, the relative position of the aperture member with respect to the optical lens module is adjustable in at least one direction.

In one embodiment, the optical element to be calibrated is pre-assembled by the adhering element.

In one embodiment, the adhering element can be a mixture glue comprising UV glue mixed with thermosetting adhesive, wherein the mixture glue is in a semi-solidified state under the UV exposure and is solidified after heat treatment, such as within an oven. Therefore, once the adhering element is solidified, the relative position of the optical element to be calibrated is permanently fixed.

In one embodiment, the image sensor comprises a color filter, a lens base, a photosensitive chip, and a control circuit board, wherein the photosensitive chip is operatively coupled on top of the control circuit board while the color filter and the photosensitive chip are coupled at the lens base. The optical lens module is coupled to the lens base that the relative position of the optical lens module with respect to the lens base is adjustable.

In one embodiment, the camera lens module can be a zoom camera lens module to include a driver unit. The image sensor comprises a color filter, a photosensitive chip, and a control circuit board, wherein the photosensitive chip is operatively coupled on top of the control circuit board while the color filter and the photosensitive chip are coupled at the lens barrel. The driver unit is operatively coupled to the lens barrel.

In one embodiment, the camera lens module is electrified during the pre-assembling process for image acquisition, wherein the calibration measurement of the optical lens module is determined through the calibration software to ensure the precise position of the optical lens module.

In accordance with another aspect of the invention, the present invention provides a lens assembly which comprises:

an optical lens set comprising at least two optical lenses;

a lens barrel set comprising at least two lens barrels, wherein at least one of the two optical lenses is correspondingly installed within one of the optical barrel, wherein when all the optical lenses are installed in the lens barrels respectively, at least two optical lens modules are formed, wherein the adjacent optical lens modules are pre-assembled while the assembling position between the optical lens modules is adjustable.

In one embodiment, the lens assembly further comprises an aperture member is provided at a distal portion of the optical lens module, wherein the assembling position of the aperture member is adjustable with respect to the position of the optical lens module.

In one embodiment, at least one of the optical lenses is installed in at least one of the lens barrels in such a manner that the assembling position of the pre-assembled optical lens is arranged to be adjustable inside the respective lens barrel.

In one embodiment, the lens barrel receiving the respective pre-assembled optical lens has at least a calibration channel which is provided in a barrel wall of the lens barrel for communicating an interior thereof with outside, wherein the calibration channel is aligned with respect to the optical lens pre-assembled within the lens barrel, such that the assembling position of the optical lens within the lens barrel can be adjusted through the calibration channel.

In one embodiment, the aperture member, the optical lens and the optical lens module are pre-assembled by an adhering element in a semi-solidified manner.

In one embodiment, the adhering element for pre-assemble can be a mixture glue comprising UV glue mixed with thermosetting adhesive, wherein the mixture glue is in a semi-solidified state under the UV exposure and is solidified after heat treatment. Therefore, once the adhering element is solidified, the whole camera lens module is permanently fixed.

In one embodiment, the assembling position of the optical lens within the optical lens module is arranged to be adjustable in at least one direction.

In one embodiment, the assembling position of the aperture member with respect to the top portion of the lens barrel is arranged to be adjustable in at least one direction.

In one embodiment, when the lens assembly is installed within the camera lens module, the relative position of the optical lens module is adjustable with respect to as many as six axes X, Y, Z, U, V, W the of the camera lens module.

In one embodiment, the lens barrel provides at least an optical element to be calibrated therein for supporting at least one optical lens.

In one embodiment, the optical element to be calibrated is formed by a protrusion radially and inwardly extended from an inner barrel wall of the lens barrel.

Accordingly, the present invention further provides a method of assembling the camera lens module, which comprises the following steps.

(A) Pre-assemble optical elements to be calibrated to form the camera lens module in the pre-assembling state.

(B) Acquire the image signal through the optical lens module of the lens assembly.

(C) Determine a calibration measurement of the optical lens module of the lens assembly by a calibration software.

(D) Adjust the relative assembling positions of the optical lens module of the lens assembly in response to the calibration measurement.

(E) When the result of the calibration meets a desired resolution, such as relative assembling position of the optical lens module of the lens assembly is adjusted to obtain the desired resolution of the camera lens module, executing the step (F), or repeat the steps (B)-(D) when the result of the calibration fails to meet the desired resolution.

(F) Permanently fix the camera lens module, such as solidifying the mixture glue to permanently fix the optical lens module of the lens assembly with the image sensor to form the camera lens module.

In one embodiment, in the step (A), the optical elements to be calibrated include at least one optical lens module which generally comprises at least one optical lens and at least one lens barrel, wherein at least one of the pre-assembled optical lens module is pre-assembled along the photosensitive path of the image sensor, while the assembling position of the pre-assembled optical lens module is arranged to be adjustable with respect to the image sensor.

In one embodiment, in the step (A), the optical elements to be calibrated include at least two optical lens modules which positions are calibrated during assembling process, wherein the optical elements to be calibrated comprises one aperture member which is pre-assembled at the top portion of the optical lens module at the outermost side of the camera lens module and the assembling position of the aperture member is adapted to be adjustable with respect to the relative position of the optical lens module.

In one embodiment, in the step (A), all the optical elements to be calibrated are pre-assembled by means of adhering element which UV glue mixed with thermosetting adhesive, wherein the mixture glue is in a semi-solidified state under UV exposure for pre-assembling. After calibration of the optical elements to be calibrated, in the step (F), the mixture glue is solidified after heat treatment so as to permanently affix the whole camera lens module.

In one embodiment, in the step (A), the camera lens module further comprises a plurality of assembled optical elements which assemble tolerance must be retained within a deviation of acceptable range.

In one embodiment, in the step (B), the pre-assembled camera lens module is electrified to collect images of the camera lens module, wherein the image collection of the camera lens module is based on the capturing of the MTF (Modulation Transfer Function) test target, and the image quality is determined by a MTF value, where the higher MTF value refers to higher image quality. A plurality of MTF value will be determined for every image collected from the camera lens module and will be compared with a predetermined threshold. When the MTF value is greater than or equal to the predetermined threshold, the collection and calibration is completed. When the MTF value is lesser than the predetermined threshold, the image collection is repeated for further calibration.

During each image acquisition process, the camera lens module must be strictly controlled for capturing each image under predetermined environment parameters which includes capturing distance and light source parameters between the MTF test target and the camera lens module to ensure the accuracy and consistency of the image acquisition for ease of the subsequent calibration process.

During the collecting process of collecting images, to the MTF values, the camera lens module should be monitored for eliminating black spot, distortion, and/or shades during the image acquisition process.

In one embodiment, in the step (C), the software used for the calibration of the assembling positions of the optical elements to be calibrated is adapted for the research based on the optical sensitivity of the optical lens components, wherein the software used for computing method of the calibration value of the assembling positions of the optical lens components includes the following steps. (1) Measure the optical characteristics of the camera lens module prior to the calibration, including MTF values, light eccentricity measurement, light axis inclination angle, and curvature of field; and (2) Compute the required calibration value of the assembling positions of the optical element to be calibrated in response to the light eccentricity measurement, light axis inclination angle and the sensitivity of the curvature of field corresponding to the assembling positions of the optical elements to be calibrated.

In one embodiment, in the step (D), the assembling positions of the optical elements to be calibrated with respect to the relative position of the camera lens module is adjusted in at least one direction.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
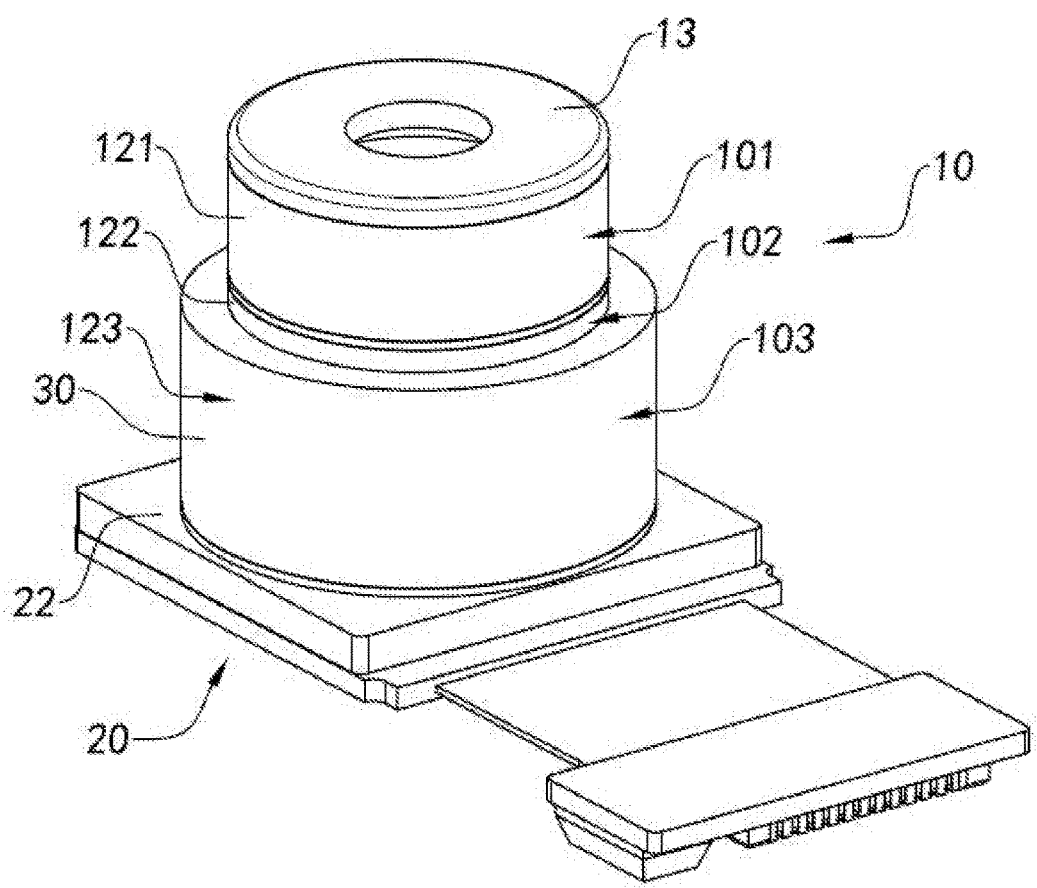
FIG. 1 is a perspective view of a camera lens module with one or more optical lens modules according to a first preferred embodiment of the present invention.
Figure 2:
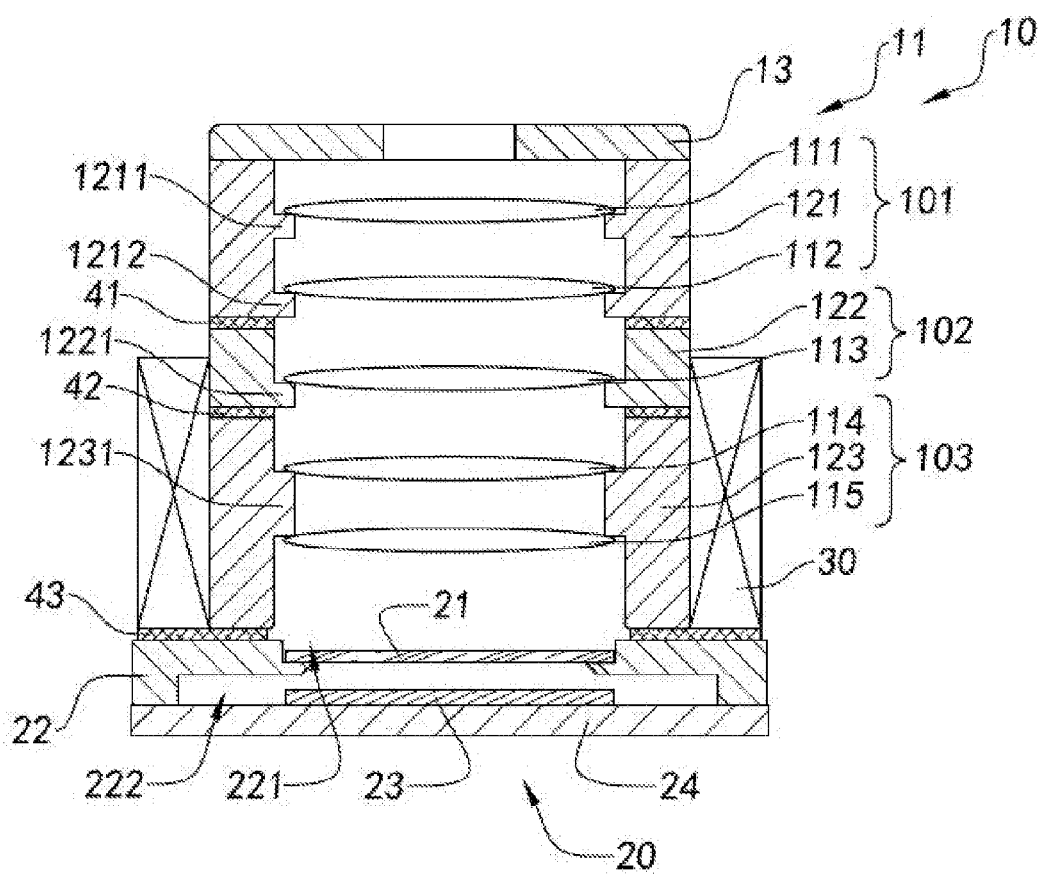
FIG. 2 is a sectional view of the camera lens module with one or more optical lens modules according to the above first preferred embodiment of the present invention.
Figure 3:
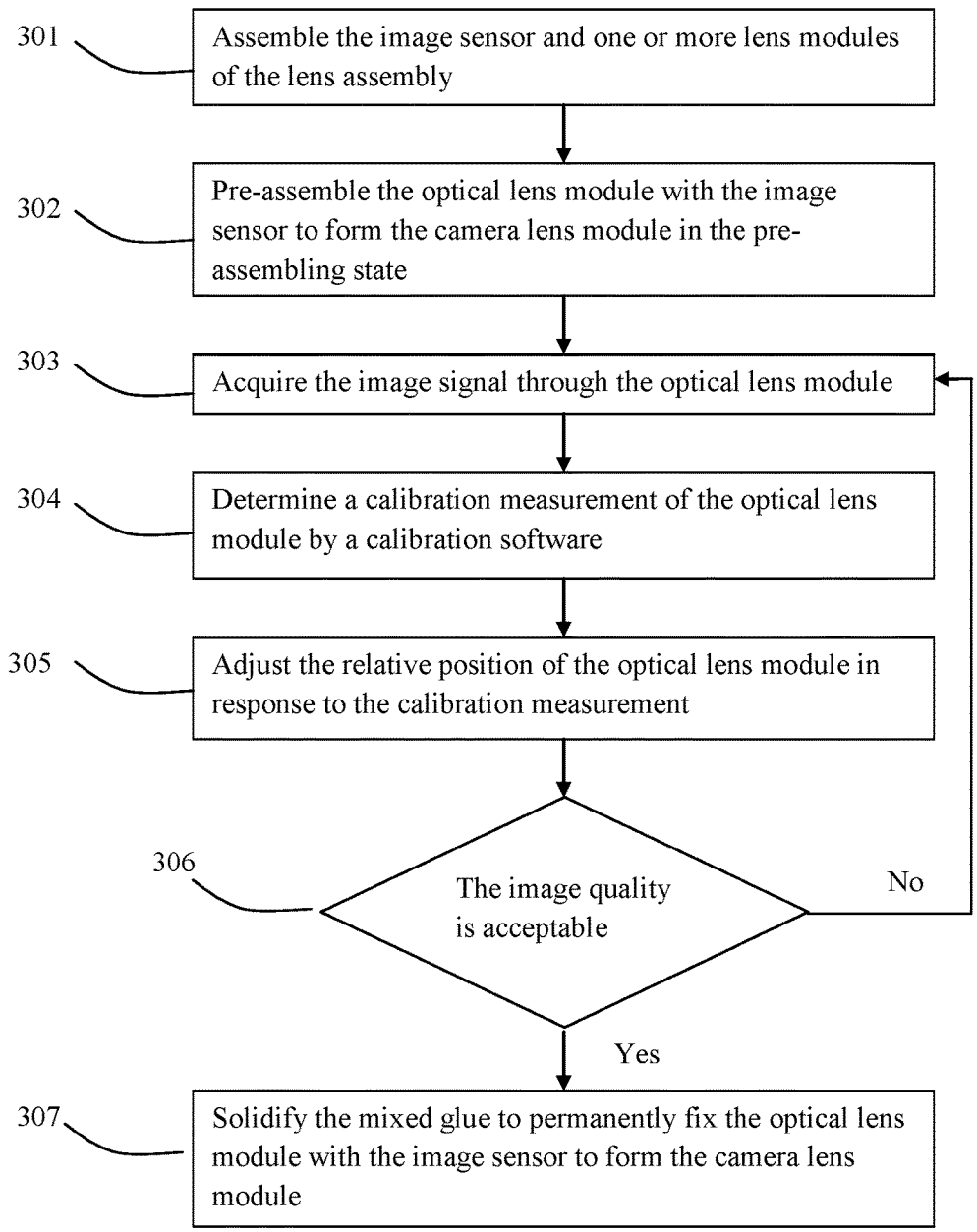
FIG. 3 is a flow diagram illustrating the assembling method of the camera lens module with one or more optical lens modules according to the above first preferred embodiment of the present invention.

Referring to FIGS. 1 to 3 of the drawings, a camera lens module according to a first preferred embodiment of the present invention is illustrated. As shown in FIGS. 1 to 3, the camera lens module, which is configured as a split-lens module, comprises a lens assembly 10 and an image sensor 20, wherein the lens assembly 10 is located along a light path of the image sensor 20, such that the image sensor 20 can pick up light incident through the lens assembly 10 and can convert the light into image signals. Accordingly, the relative assembling position of the lens assembly 10 with respect to the image sensor 20 is adjustable.

According to the preferred embodiment, the image sensor 20 comprises a color filter 21, a lens base 22, a photosensitive chip 23, and a control circuit board 24. The color filter 21 is coupled at the lens base 22 at a position above the photosensitive chip 23. In other words, the color filter 21 is provided along a photosensitive path of the photosensitive chip 23. The photosensitive chip 23 is operatively coupled on top of the control circuit board 24, preferably by glue, wherein the control circuit board 24 is supported at a bottom of the lens base 22.

In particular, the lens base 22, which is configured to have a hollow structure, has a first holding groove 221 indently formed within an inner surrounding wall of the lens base 22 at an upper portion thereof, and a second holding groove 222 indently formed within the inner surrounding wall of the lens base 22 at a lower portion thereof to coaxially align with the first holding groove 221. The color filter 21 and the photosensitive chip 23 are supported by the first holding groove 221 and the second holding groove 222 respectively, wherein the photosensitive chip 23 is operatively coupled onto the control circuit board 24, such that the photosensitive chip 23 picks up light incident from the lens assembly 10 through the lens base 22 and converts the light into image signals.

In one embodiment, the first and second holding grooves 221, 222 have a rectangular cross section. It is appreciated that the first and second holding grooves 221, 222 can be modified to have different cross section according to the structural configuration of the image sensor 20.

The lens assembly 10 comprises an optical lens set 11, a lens barrel set 12, and an aperture member 13 coupled on top of the lens barrel set 12, wherein the optical lens set 11 is located within the lens barrel set 12 at a position below the aperture member 13 and is located along the photosensitive path of the photosensitive chip 23. The lens barrel set 12 is coupled at the image sensor 20, wherein a relative assembling position of the lens barrel set 12 is arranged to be adjustable with respect to the image sensor 20 to ensure the image quality of the camera lens module.

The camera lens module further comprises a driver unit 30 operatively provided at the lens barrel set 12 and coupled to the lens base 22, wherein the driver unit 30 is arranged to selectively adjust the positional displacement of the lens barrel set 12 along the photosensitive path of the photosensitive chip 23. In one embodiment, the driver unit 30 comprises a voice coil motor to drive the lens barrel set 12 to move.

According to the preferred embodiment, the optical lens set 11 comprises a first optical lens 111, a second optical lens 112, a third optical lens 113, a fourth optical lens 114, and a fifth optical lens 115, wherein the first to fifth optical lenses 111-115 are arranged for convergence or divergence of the light beam to be collected. The lens barrel set 12 comprises a first lens barrel 121, a second lens barrel 122, and a third lens barrel 123.

Accordingly, the aperture member 13 is coupled at a top edge of the first lens barrel 121 at a position above the first optical lens 111, wherein the first lens barrel 121 comprises a first positioning unit 1211 and a second positioning unit 1212. The first and second positioning units 1211, 1212 are radially and inwardly extended from an inner barrel wall of the first lens barrel 121. Preferably, the first and second positioning units 1211, 1212 are provided at a mid-portion and a lower portion of the first lens barrel 121 respectively, wherein the first and second optical lenses 111, 112 are supported by the first and second positioning units 1211, 1212 respectively, such that the first and second optical lenses 111, 112 are spaced apart from each other and are securely mounted within the first lens barrel 121. It is worth mentioning that the first optical lens 111 and the second optical lens 112 are supported within the first lens barrel 121 to form a first optical lens module 101. According to the preferred embodiment, the first optical lens module 101 is mounted at the outermost position of the camera lens module, i.e. the top position of the lens assembly 10 and the farthest distance from the image sensor 20, wherein the aperture member 13 is coupled at a top portion of the first optical lens module 101.

The second lens barrel 122 comprises a third positioning unit 1221 radially and inwardly extended from an inner barrel wall of the second lens barrel 122. Preferably, the third positioning unit 1221 is provided at a lower portion of the second lens barrel 122, wherein the third optical lens 113 is supported by the third positioning unit 1221, such that the third optical lens 111 is securely mounted within the first lens barrel 121 to form a second optical lens module 102.

The third lens barrel 123 comprises a fourth positioning unit 1231 radially and inwardly extended from an inner barrel wall of the third lens barrel 123. Preferably, the fourth positioning unit 1231 is provided at a mid-portion of the third lens barrel 123, wherein the fourth and fifth optical lenses 114, 115 are supported by the fourth positioning unit 1231. In particular, the fourth optical lens 114 is supported on top of the fourth positioning unit 1231 and the fifth optical lens 115 is supported on below the fourth positioning unit 1231. It is worth mentioning that the driver unit 30 is operatively integrated with the third lens barrel 123, such that the fourth and fifth optical lenses 114, 115, the third lens barrel 123, and the driver unit 30 are assembled together to form a third optical lens module 103.

According to the preferred embodiment, the first positioning unit 1211, the second positioning unit 1212 and the third positioning unit 1221, are integrally protruded from the inner barrel walls of the first and second lens barrels 121, 122 to form a plurality of annular protruding platforms. It is appreciated that any shape of the protruding platform can be modified as long as the corresponding optical lens can be supported thereby.

Accordingly, the first optical lens module 101 is coaxially coupled at the second optical lens module 102 by a first adhering element 41. The second optical lens module 102 is coaxially coupled at the third optical lens module 103 by a second adhering element 42. The third optical lens module 103 is coupled at the lens base 22 by a third adhering element 43. Each of the first through third adhering elements 41, 42, 43 is preferably a mixture glue comprising UV glue mixed with thermosetting adhesive, wherein the mixture glue is in a semi-solidified state under UV exposure and is solidified after heat treatment, such as within an oven or in a heated environment. Therefore, the first optical lens module 101, the second optical lens module 102, the third optical lens module 103, and the lens base 22 are coupled with each other by means of the mixture glue in the semi-solidified state to complete the pre-assembling of the camera lens module. After the initial pre-assembling process, the first optical lens module 101, the second optical lens module 102 and the third optical lens module 103 are optical elements to be calibrated. Under the initial assembling condition, the first optical lens module 101, the second optical lens module 102, and the third optical lens module 103 can be selectively adjusted to correct an optical specification of the camera lens module for calibration. In other words, the relative assembling positions of the first optical lens module 101, the second optical lens module 102, the third optical lens module 103 and the lens base 22 are adjustable to fix the assembling tolerance of the lens assembly 10, so as to achieve the desired image quality of the camera lens module. Once the relative positions are fixed and corrected, the mix glues are then solidified to securely retain and permanently mount the relative positions of the first optical lens module 101, the second optical lens module 102, the third optical lens module 103 and the lens base 22 for the camera lens module.

Preferably, at least one of the optical lenses in one of the first optical lens module 101, the second optical lens module 102, and the third optical lens module 103 is a movable optical lens as a optical correction lens to correct and fix the optical specification of the camera lens module. The rest of the optical lenses can be the fixed optical lenses. In other words, at least one of the optical lenses in one of the first optical lens module 101, the second optical lens module 102, and the third optical lens module 103 serves as an optical element to be calibrated while the rest of the optical lens modules are fixed optical lenses.

It is worth mentioning that only one lens barrel can be constructed in the lens barrel set 12. Preferably, more than one lens barrels are constructed to form the lens barrel set 12, and more than one optical lenses are mounted on each of the lens barrels. The lens barrel with the optical lens or the aperture member can form one or more optical lens modules. In other words, the numbers of optical lens, lens barrel, and optical lens module can be varied depending on the structural configuration of the camera lens module. Therefore, the present invention should not be limited by the numbers of optical lens, lens barrel, and optical lens module.

According to the preferred embodiment, the present invention further provides a method of assembling the camera lens module with one or more optical lens modules, which comprises the following steps.

Step 301: Assemble the image sensor and one or more optical lens modules of the camera lens module.

Step 302: Pre-assemble the optical lens module with the image sensor to form the camera lens module in the pre-assembling state.

Step 303: Acquire one or more image signals through the optical lens module of the camera lens module.

Step 304: Determine a calibration measurement of the optical lens module by a calibration software.

Step 305: Adjust the assembling position of the optical lens module in response to the calibration measurement.

Step 306: When the assembling position of the optical lens module is adjusted to achieve a desired resolution of the camera lens module, go to Step 307. Otherwise, repeat Step 303 to Step 305 until the desired resolution of the each of the optical lens modules of the lens assembly, i.e. the image quality is acceptable, is obtained.

Step 307: Solidify the mixture glue to permanently fix the one or more optical lens modules of the lens assembly with the image sensor to form the camera lens module.

Accordingly, the Step 301 further comprises the following steps. The color filter 21 is coupled at the first holding groove 221 of the lens base 22. The photosensitive chip 23 is operatively coupled on the top side of the control circuit board 24. Then, the lens base 22 is coupled on the top side of the control circuit board 24 to support the photosensitive chip 23 within the second holding groove 222. The assembling process of the image sensor 20 is completed to couple with the lens assembly 10.

The optical lens set 11, the lens barrel set 12, and the aperture member 13 are assembled to form the first optical lens module 101, the second optical lens module 102, and the third optical lens module 103.

In particular, the aperture member 13 is coupled on the top portion of the first lens barrel 121. The first and second optical lenses 111, 112 are supported by the first and second positioning units 1211, 1212 of the first lens barrel 121 respectively to form the first optical lens module 101. Preferably, in the first optical lens module 101, the aperture member 13, the first optical lens 111, and the second optical lens 112 are affixedly mounted to the first lens barrel 121 in an immovable manner, such that the relative assembling positions of the aperture member 13, the first optical lens 111, and the second optical lens 112 cannot be adjusted to the first lens barrel 121 for the first optical lens module 101.

The third optical lens 113 is supported by the third positioning unit 1221 of the second lens barrel 122. Preferably, the relative position of the third optical lens 113 cannot be adjusted within the second lens barrel 122, such that the third optical lens 113 is affixed within the second lens barrel 122 by the third positioning unit 1221 thereof in an immovable manner.

The fourth optical lens 114 is mounted at a top side of the fourth positioning unit 1231 of the third lens barrel 123 while the fifth optical lens 115 is mounted at a bottom side of the fourth positioning unit 1231 of the third lens barrel 123. Preferably, the relative positions of the fourth optical lens 114 and the fifth optical lens 115 cannot be adjusted within the third lens barrel 123, such that the fourth optical lens 114 and the fifth optical lens 115 are affixed within the third lens barrel 123 by the fourth positioning unit 1231 thereof in an immovable manner. Accordingly, the driver unit 30 is coaxially mounted to the third lens barrel 123.

In the Step 302, the third adhering element 43 is initially applied to couple the third optical lens module 103 at the lens base 22, the second adhering element 42 is applied to coaxially couple the second optical lens module 102 at the third optical lens module 103, and then the first adhering element 41 is applied to coaxially couple the first optical lens module 101 at the second optical lens module 102. Therefore, the pre-assembly of the optical lens module with the image sensor is completed. It is worth mentioning that the adhering steps can be reversed that the first adhering element 41 is applied to initially couple the first optical lens module 101 at the second optical lens module 102, the second adhering element 42 is applied to coaxially couple the second optical lens module 102 at the third optical lens module 103, and then the third adhering element 43 is applied to couple the third optical lens module 103 at the lens base 22, in order to complete the pre-assembly of the optical lens module with the image sensor.

It is worth mentioning that the first, second, third adhering elements 41, 42, 43 are applied in a semi-solidified state during the pre-assembling process. As it is mentioned above each of the first through third adhering elements 41, 42, 43 is a mixture glue comprising UV glue mixed with thermo-setting adhesive, wherein the mixture glue is in a semi-solidified state under UV exposure and is solidified after heat treatment. Therefore, the mixture glue in a semi-solidified state for pre-assembling the camera lens module, such that the optical lens modules can be slightly moved and adjusted for calibration while the optical lens modules can be held correspondingly. In other words, through the pre-assembling process, the relative assembling positions of the first optical lens module 101, the second optical lens module 102, and the third optical lens module 103 can be selectively adjusted to align with a centerline of the lens assembly 10 so as to align with the centerline of the photosensitive chip 23 within the deviation range thereof for achieving the desired image quality of the camera lens module.

In the Step 303 and the Step 304, the camera lens module at the pre-assembling state is electrified to collect the one or more image signals from the image sensor. Through the calibration software, the calibration measurements of the first optical lens module 101, the second optical lens module 102, and the third optical lens module 103 will be determined.

Preferably, the image collection of the camera lens module is based on MTF (Modulation Transfer Function) test target, the image quality is determined by a MTF value. Accordingly, the higher MTF value refers to higher image quality. A plurality of MTF values will be determined for every image collected from the camera lens module and will be compared with a predetermined threshold. When the MTF value is greater than or equal to the predetermined threshold, the collection and calibration is completed. When the MTF value is lesser than the predetermined threshold, the image collection is repeated for further calibration.

It is worth mentioning that in each image acquisition process, the camera lens module must be strictly controlled for capturing each image under predetermined environment parameters which includes the capturing distance and light source parameters of the test target and the camera lens module to ensure the accuracy and consistency of the image acquisition for easily calibration.

In addition to the MTF values, the camera lens module should be monitored for eliminating black spot, distortion, and/or shades during the image acquisition process.

It is worth mentioning that the calibration software is used for calibrating the relative assembling positions of the first optical lens module 101, the second optical lens module 102, and the third optical lens module 103 based on the optical sensitivity of the optical lens. Accordingly, the calibration process of the assembling positions of the first optical lens module 101, the second optical lens module 102, and the third optical lens module 103, based on the calibration software used, comprises the following steps. (1) Measure the optical characteristics of the camera lens module prior to the calibration, including MTF values, light eccentricity measurement, light axis inclination angle, and curvature of field. (2) In response to the MTF values, light eccentricity measurement, light axis inclination angle, and curvature of field corresponding to the relative assembling positions of the first optical lens module 101, the second optical lens module 102, and the third optical lens module 103, determine the calibration measurements of the first optical lens module 101, the second optical lens module 102, and the third optical lens module 103.

After the calibration measurement of the optical lens module is determined in the Step 304, the relative positions of the first optical lens module 101, the second optical lens module 102, and the third optical lens module 103 will be adjusted in response to the calibration measurement as shown in the Step 305. It is worth mentioning that the relative positions of the optical lens modules can be adjusted at the same time or individually. The relative positions of the first optical lens module 101, the second optical lens module 102, and the third optical lens module 103 can be selectively adjusted to align with the centerline of the lens assembly 10 so as to align with the centerline of the photosensitive chip 23 within the deviation range thereof for achieving the desired image quality of the camera lens module.

In addition, the relative positions of the first optical lens module 101, the second optical lens module 102, and the third optical lens module 103 are calibrated by the following steps. The relative assembling positions of the first optical lens module 101, the second optical lens module 102, and the third optical lens module 103 are defined at six axes X, Y, Z, U, V, W of the camera lens module. Adjust the relative position of each of the first optical lens module 101, the second optical lens module 102, and the third optical lens module 103 along at least one of the horizontal direction, vertical direction, inclination direction, and circumferential direction.

It is worth mentioning that the image acquisition is required for every position adjustment of the first optical lens module 101, the second optical lens module 102, and the third optical lens module 103, such that each calibration of the camera lens module is based on the previous image acquisition. In other words, the Step 303, the Step 304, and the Step 305 are repeated to calibrate the relative positions of the first optical lens module 101, the second optical lens module 102, and the third optical lens module 103 until the desired image quality of the camera lens module is achieved and then the Step 307 is executed to solidify the mixture glue to form the lens assembly 10.

Accordingly, the mixture glue is exposed under UV environment in the Step 302. Then, after the calibration process is completed, the camera lens module is, for example, sent into the oven for heat treatment of the mixture glue. Once the mixture glue is solidified, the components of the camera lens module are permanently fixed to form the integrated configuration so as to prevent any unwanted displacement of each of the components which will affect the image quality of the camera lens module.

It is worth mentioning that, in the Step 302, the first optical lens module 101, the second optical lens module 102, and the third optical lens module 103 are overlapped with each other in a predetermined array. In other words, the relative positions of the first optical lens module 101, the second optical lens module 102, and the third optical lens module 103 cannot be interchanged. However, the assembling order of the first optical lens module 101, the second optical lens module 102, and the third optical lens module 103 can be altered. For example, the first optical lens module 101 can be initially pre-coupled to the second optical lens module 102, and the second optical lens module 102 can be pre-coupled to the third optical lens module 103, then the third optical lens module 103 is pre-coupled to the lens base 22 to form the camera lens module. Alternatively, the second optical lens module 102 can be initially pre-coupled to the third optical lens module 103, and the first optical lens module 101 can be pre-coupled to the second optical lens module 102, then the third optical lens module 103 is pre-coupled to the lens base 22 to form the camera lens module. Or, after coupling the first optical lens module 101 to the second optical lens module 102, the first and second optical lens modules 101, 102 are coupled to the third optical lens module 103, and then the third optical lens module 103 is coupled to the lens base 22 to form the camera lens module. Or after coupling the first, second, and third optical lens modules 101, 102, 103 with each other, the three lens modules are coupled to the lens base 22 to form the camera lens module. The present invention should not be limited by the assembling order and numbers of the optical lens modules.

When four or more optical lens modules are assembled, the relative positions of the optical lens modules, beside the first and the last optical lens modules, can be interchangeable.

It is worth mentioning that during the assembling process and the pre-assembling process, different tolerances of the camera lens module must be controlled, including (1) the assembling tolerance of the connection between the aperture member 13 and the first lens barrel 121, (2) the assembling tolerances of the connection between the first optical lens 111 and the first lens barrel 121, and the connection between the second optical lens 111 and the first lens barrel 121, (3) the assembling tolerance of the connection between the third optical lens 113 and the second lens barrel 122, (4) the assembling tolerances of the connection between the fourth optical lens 114 and the third lens barrel 123, and the connection between the fifth optical lens 115 and the third lens barrel 123, (5) the assembling tolerances of the connection between the color filter 21 and the lens base 22, the connection between the lens base 22 and the control circuit board 24, and the connection between the photosensitive chip 23 and the control circuit board 24. If any one of the above tolerances is unacceptable, there will be hard to calibrate the relative positions of the first optical lens module 101, the second optical lens module 102, and the third optical lens module 103, or even cannot achieve the desired resolution of the camera lens module.

It is worth mentioning that the calibration of the relative positions of the optical lens modules also refers to the calibration of the relative assembling positions of the optical lens modules.

Figure 4:
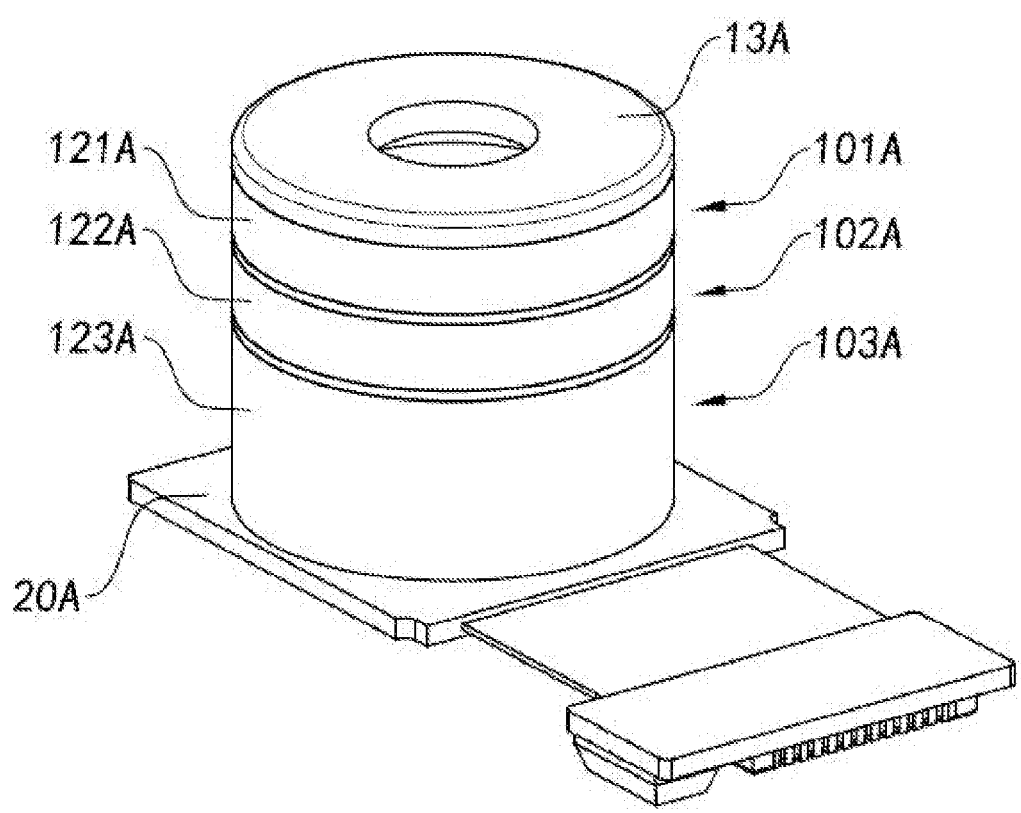
FIG. 4 is a perspective view of a camera lens module with one or more optical lens modules according to a second preferred embodiment of the present invention.
Figure 5:
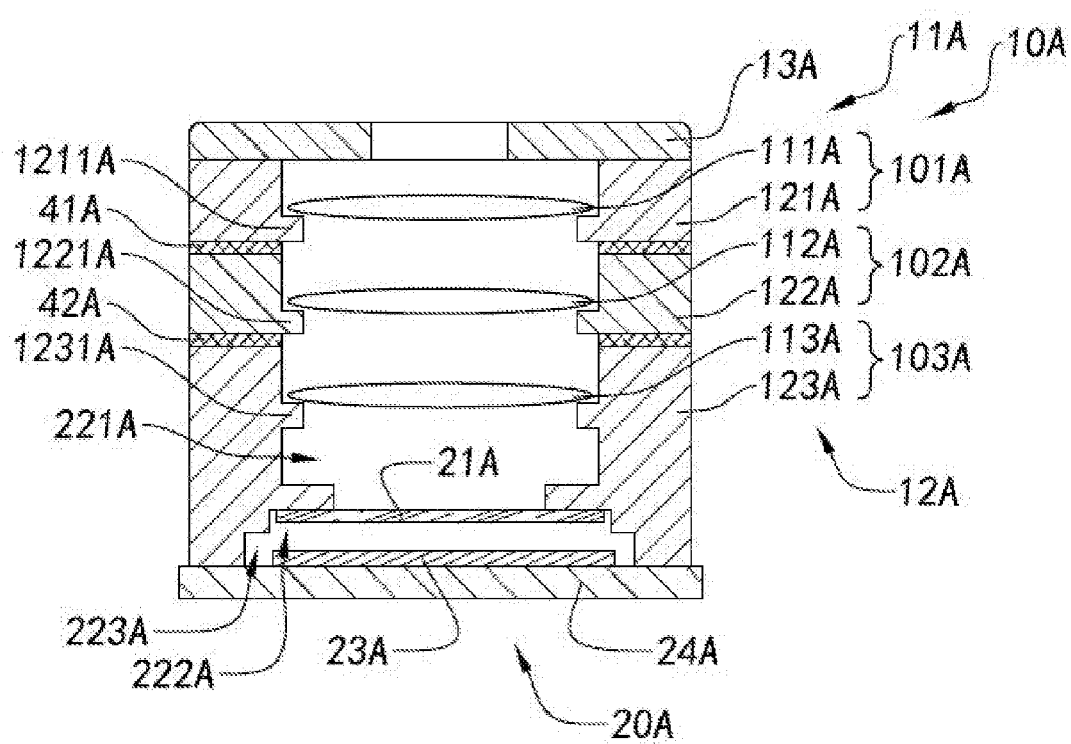
FIG. 5 is a sectional view of the camera lens module with one or more optical lens modules according to the above second preferred embodiment of the present invention.

As shown in FIGS. 4 and 5, a camera lens module according to a second embodiment illustrates an alternative mode of the first embodiment, wherein the camera lens module comprises a lens assembly 10A and an image sensor 20A, wherein the lens assembly 10A is located along a light path of the image sensor 20A, such that the image sensor 20A can pick up light incident through the lens assembly 10A and can convert the light into image signals. Accordingly, the assembling position of the lens assembly 10A with respect to the image sensor 20A is adjustable.

The lens assembly 10A comprises an optical lens set 11A, a lens barrel set 12A, and an aperture member 13A coupled on top of the lens barrel set 12A, wherein the optical lens set 11A is located within the lens barrel set 12A at a position below the aperture member 13A and is located along the photosensitive path of the photosensitive chip 23A. The lens barrel set 12A is coupled at the image sensor 20A, wherein the assembling position of the lens barrel set 12A with respect to the image sensor 20A is adjustable to ensure the image quality of the camera lens module.

According to the second embodiment, the optical lens set 11A comprises a first optical lens 111A, a second optical lens 112A, and a third optical lens 113A. The lens barrel set 12A comprises a first lens barrel 121A, a second lens barrel 122A, and a third lens barrel 123A. The first lens barrel 121A, the second lens barrel 122A, and the third lens barrel 123A are orderly and coaxially coupled with each other that the second lens barrel 122A is located between the first lens barrel 121A and the third lens barrel 123A. The first optical lens 111A, the second optical lens 112A, and the third optical lens 113A are supported within the first lens barrel 121A, the second lens barrel 122A, and the third lens barrel 123A respectively. The third lens barrel 123A also serves as a lens base. It is worth mentioning that the driver unit is omitted in the camera lens module of the second embodiment as a fixed-focus camera lens module. According to the present invention, the camera lens module in different embodiments can be the fixed-focus camera lens module or the zoom camera lens module.

According to the second embodiment, the image sensor 20A comprises a color filter 21A, a lens base 22A (i.e. the third lens barrel 123A), a photosensitive chip 23A, and a control circuit board 24A. The color filter 21A is coupled at the third lens barrel 123A at a position above the photosensitive chip 23A. In other words, the color filter 21A is provided along a photosensitive path of the photosensitive chip 23A. The photosensitive chip 23A is operatively coupled on top of the control circuit board 24A.

In particular, the third lens barrel 123A, which is configured to have a hollow structure, has a first holding groove 221A indently formed within an inner surrounding wall of the third lens barrel 123A, a second holding groove 222A indently formed within the inner surrounding wall of the third lens barrel 123A, and a third holding groove 223A indently formed within the inner surrounding wall of the third lens barrel 123A, wherein the first, second, and third holding grooves 221A, 222A, 223A are coaxially aligned with each other and are formed at an upper portion, a mid-portion, and a lower portion of the third lens barrel 123A respectively. The color filter 21A is supported by the second holding groove 222A, the photosensitive chip 23A is supported by the third holding groove 223A and is operatively coupled on the top side of the control circuit board 24A, wherein the photosensitive chip 23A picks up light incident from the lens assembly 10A and converts the light into image signals.

The aperture member 13A is coupled at a top portion of the first lens barrel 121A, wherein the first lens barrel 121A comprises a first positioning unit 1211A formed at the lower portion of the first lens barrel 121A. The first positioning unit 1211A is radially and inwardly extended from an inner barrel wall of the first lens barrel 121A, wherein the first positioning unit 1211A is integrally protruded from the inner barrel walls of the first lens barrel 121A to form an annular protruding platform. The first optical lens 111A is supported at the first positioning unit 1211A of the first lens barrel 121A to form a first optical lens module 101A. Accordingly, the first optical lens 11A is located at the farther location of the camera lens module where the aperture member 13A is coupled at the top portion of the first optical lens module 101A.

The second lens barrel 122A has a second positioning unit 1221A formed at the lower portion of the second lens barrel 122A. The second positioning unit 1221A is radially and inwardly extended from an inner barrel wall of the second lens barrel 122A, wherein the second positioning unit 1221A is integrally protruded from the inner barrel walls of the second lens barrel 122A to form an annular protruding platform. The second optical lens 112A is supported at the second positioning unit 1221A of the second lens barrel 122A to form a second optical lens module 102A.

The third lens barrel 123A has a third positioning unit 1231A formed at the upper portion of the third lens barrel 123A. The third positioning unit 1231A is radially and inwardly extended from an inner barrel wall of the third lens barrel 123A, wherein the third positioning unit 1231A is integrally protruded from the inner barrel walls of the third lens barrel 123A to form an annular protruding platform. The third positioning unit 1231A is located above the first holding groove 221A. The third optical lens 113A is supported at the third positioning unit 1231A of the third lens barrel 123A to form a third optical lens module 103A. Since the third optical lens 113A is supported within the third lens barrel 123A, the color filter 21A, the photosensitive chip 23A, and the control circuit board 24A are assembled together with the third optical lens 113A in the third lens barrel 123A. In other words, the color filter 21A, the photosensitive chip 23A, the control circuit board 24A are assembled in the third lens barrel 123A to form the image sensor 20A.

It is worth mentioning that the first holding groove 221A is configured to have a circular cross section while the second and third holding grooves 222A, 223A are configured to have a rectangular cross section. The first positioning unit 1211A, the second positioning unit 1221A, and the third positioning unit 1231A are configured to have a circular protruding platform. The shapes of the holding groove and the positioning unit are shown for illustrative purpose and should not be limited. It is worth mentioning that the first holding groove 221A, the second holding groove 222A, and the third holding groove 223A can be modified to have different structures for supporting the color filter 21A, the photosensitive chip 23A, and the control circuit board 24A. Also, the first positioning unit 1211A, the second positioning unit 1221A, and the third positioning unit 1231A can be modified to have different structures for supporting the first optical lens 111A, the second optical lens 112A, and the third optical lens 113A.

Before the pre-assembling process of the camera lens module, the optical lens modules are assembled. In particular, the aperture member 13A and the first optical lens 111A are coupled at the first lens barrel 121A to form the first optical lens module 101A. The second optical lens 112A is coupled at the second lens barrel 122A to form the second optical lens module 102A. The third optical lens 113A is coupled at the third lens barrel 123A to form the third optical lens module 103A. Then, the color filter 21A, the photosensitive chip 23A, and the control circuit board 24A are coupled at the third lens barrel 123A to form the image sensor 20A. During the assembling process of each component, different tolerances of the camera lens module must be controlled with the acceptable range. If any one of the above assembling tolerances is unacceptable, there will be hard to calibrate the relative positions of the first optical lens module 101A, the second optical lens module 102A, and the third optical lens module 103A, or even cannot achieve the desired resolution of the camera lens module.

According to the second embodiment, the first optical lens module 101A and the second optical lens module 102A are pre-assembled, wherein the optical lens module 101A and the second optical lens module 102A are calibrated to selectively adjust the relative positions of the optical lens module 101A and the second optical lens module 102A. In other words, each of the first optical lens module 101A and the second optical lens module 102A serves as an optical element to be calibrated to selectively adjust the relative positions of the optical lens module 101A and the second optical lens module 102A.

During the pre-assembling process, the second optical lens module 102A is coupled at the third optical lens module 103A via the first adhering element 41A, and then the first optical lens module 101A is coupled at the second optical lens module 102A via the second adhering element 42A. It is worth mentioning that the above steps are reversible, wherein the first optical lens module 101A is coupled at the second optical lens module 102A via the second adhering element 42A and then the second optical lens module 102A is coupled at the third optical lens module 103A via the first adhering element 41A. It is worth mentioning that the first adhering element 41A and the second adhering element 42A are in a semi-solidified state under the UV exposure during the pre-assembling process.

The calibration of the camera lens module according to the second embodiment is the same as the first embodiment, wherein the relative positions of the first optical lens module 101A and the second optical lens module 102A can be selectively adjusted to align with a centerline of the lens assembly 10A so as to align with the centerline of the photosensitive chip 23A within the deviation range thereof for achieving the desired image quality of the camera lens module.

Figure 6:
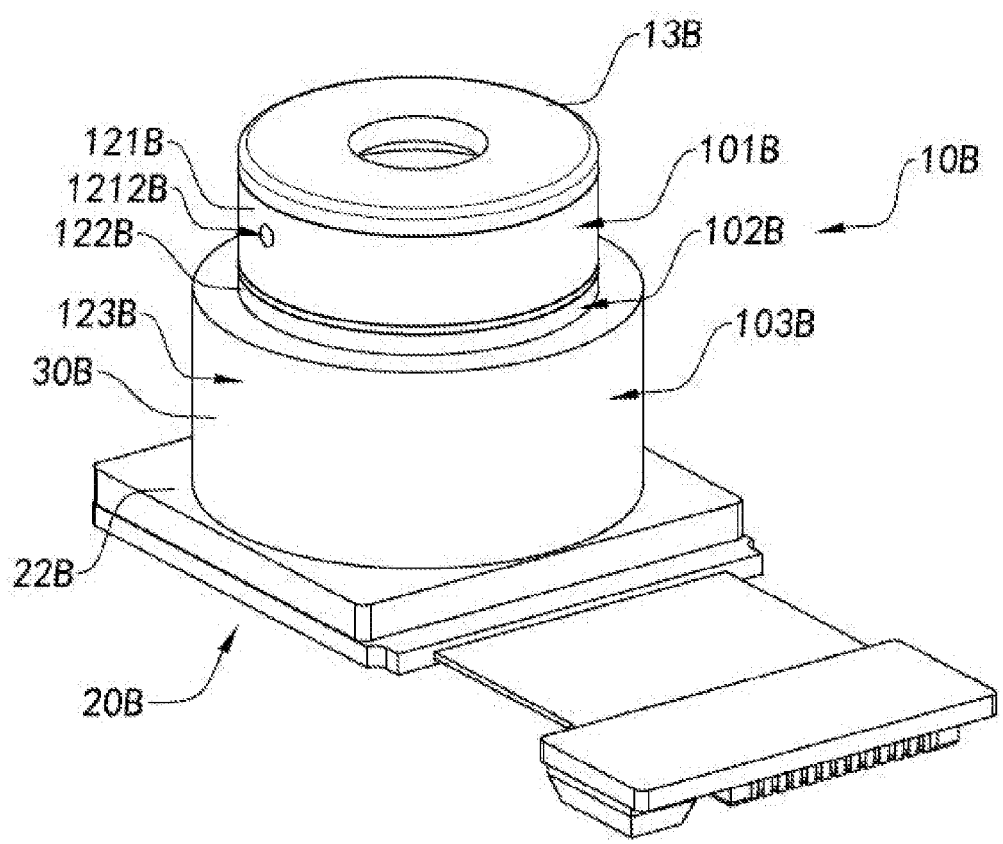
FIG. 6 is a perspective view of a camera lens module with one or more optical lens modules according to a third preferred embodiment of the present invention.
Figure 7:
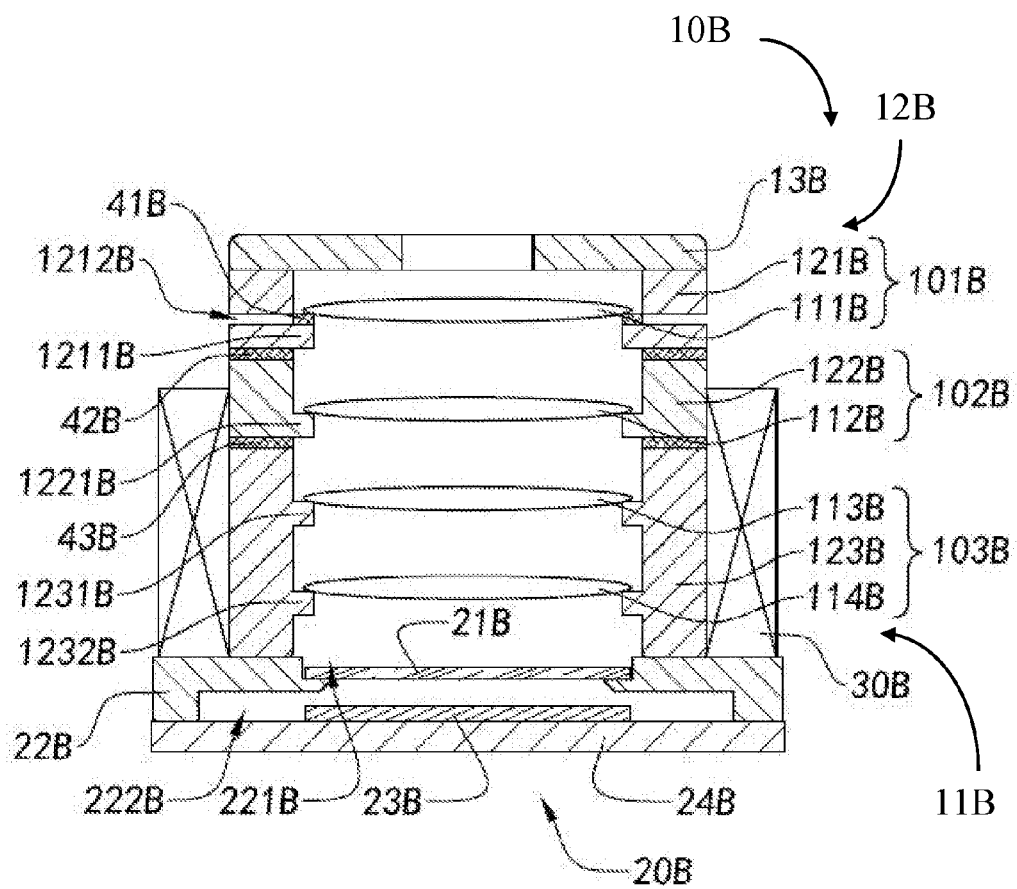
FIG. 7 is a sectional view of the camera lens module with one or more optical lens modules according to the above third preferred embodiment of the present invention.
Figure 8:
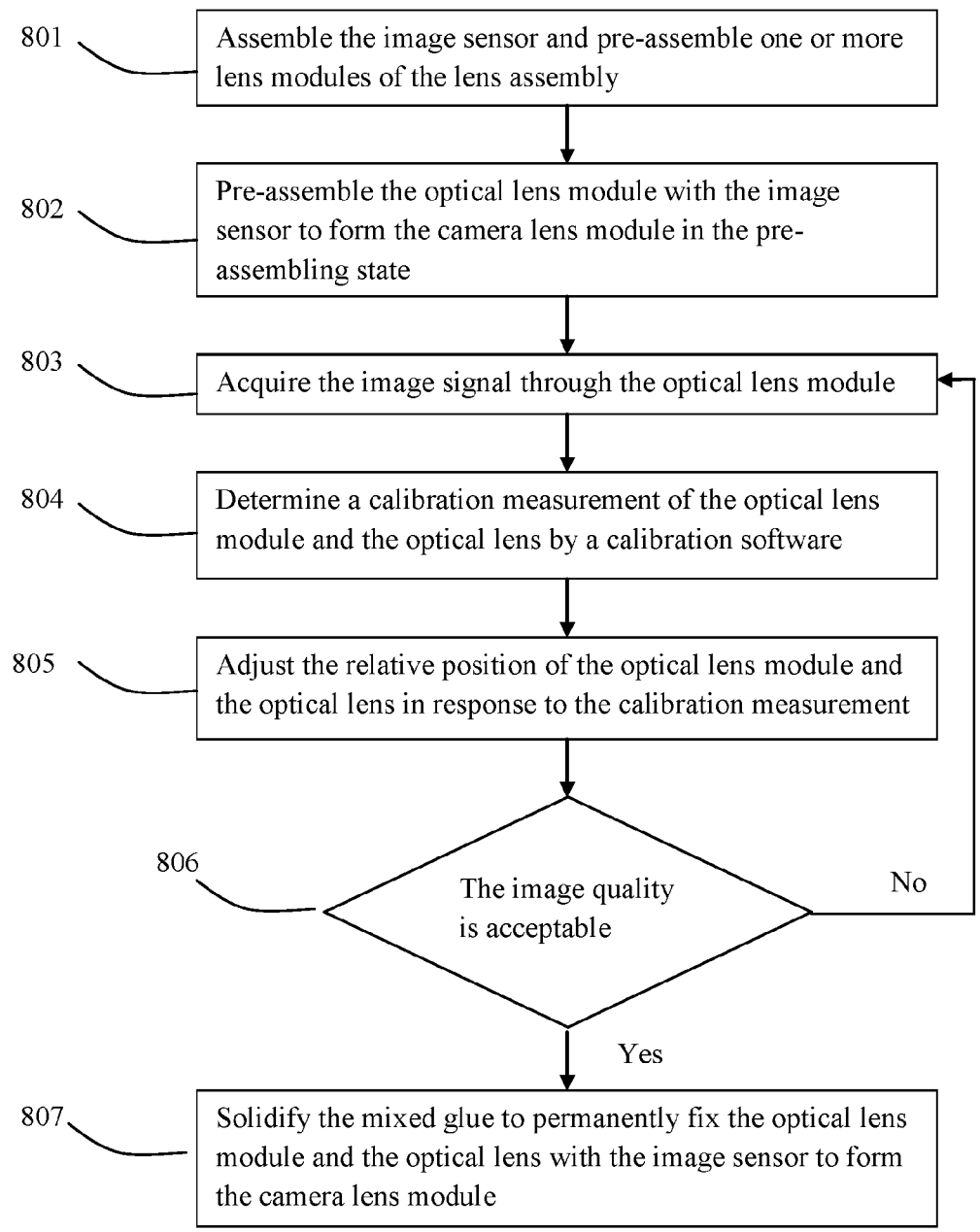
FIG. 8 is a flow diagram illustrating the assembling method of the camera lens module with one or more optical lens modules according to the above third preferred embodiment of the present invention.

As shown in FIGS. 6 to 8, a camera lens module according to a third embodiment illustrates an alternative mode of the first and second embodiments, wherein the camera lens module comprises a lens assembly 10B and an image sensor 20B, wherein the lens assembly 10B is located along a light path of the image sensor 20B, such that the image sensor 20B can pick up light incident through the lens assembly 10B and can convert the light into image signals. Accordingly, the relative assembling position of the lens assembly 10B with respect to the image sensor 20B is adjustable.

The lens assembly 10B comprises an optical lens set 11B, a lens barrel set 12B, and an aperture member 13B, wherein the optical lens set 11B and the aperture member 13B are coupled at the lens barrel set 12B according to the optical path configuration. The optical lens set 11B comprises a first optical lens 111B, a second optical lens 112B, a third optical lens 113B, and a fourth optical lens 114B. The lens barrel set 12B comprises a first lens barrel 121B, a second lens barrel 122B, and a third lens barrel 123B. The aperture member 13B and the first optical lens 111B are spacedly coupled at the first lens barrel 121B according to the optical path configuration. In particular, the aperture member 13B is coupled on a top edge of the first lens barrel 121B while the first optical lens 111B is supported within the first lens barrel 121B to form a first optical lens module 101B. The second optical lens 112B is supported within the second lens barrel 122B to form a second optical lens module 102B. The third optical lens 113B, the fourth optical lens 114B, and the driver unit 30B are coupled at the third lens barrel 123B to form a third optical lens module 103B.

The image sensor 20B comprises a color filter 21B, a lens base 22B, a photosensitive chip 23B, and a control circuit board 24B. The color filter 21B is coupled at the lens base 22B at a position above the photosensitive chip 23B. In other words, the color filter 21B is provided along a photosensitive path of the photosensitive chip 23B. The photosensitive chip 23B is operatively coupled on top of the control circuit board 24B.

The lens base 22B has a first holding groove 221B indently formed within an inner surrounding wall of the lens base 22B and a second holding groove 222B indently formed within the inner surrounding wall of the lens base 22B, wherein the first holding groove 221B and the second holding groove 222B are formed at the upper portion and the lower portion of the lens base 22B respectively. The color filter 21B is supported by the first holding groove 221B. The photosensitive chip 23B is supported by the second holding groove 222B and is operatively coupled on the top side of the control circuit board 24B, wherein the photosensitive chip 23B picks up light incident from the lens assembly 10B and converts the light into image signals.

Accordingly, the third lens barrel 123B is permanently affixed to the lens base 22B, such that the relative position of the third lens barrel 123B cannot be adjusted in response to the lens base 22B. During the assembling process, the third optical lens 113B and the fourth optical lens 114B are supported within the third lens barrel 123B via a third positioning unit 1231B and a fourth positioning unit 1232B respectively. The third and fourth positioning units 1231B, 1232B are radially and inwardly extended from an inner barrel wall of the third lens barrel 123B. In addition, the third optical lens module 103B is permanently affixed to the image sensor 20B, such that the relative position of the third optical lens module 103B cannot be adjusted in response to the image sensor 20B. In other words, the third optical lens module 103B cannot be calibrated during the calibrating process.

During the assembling process of the second optical lens module 102B, the second optical lens 112B is supported within the second lens barrel 122B via a second positioning unit 1221B which is radially and inwardly extended from an inner barrel wall of the second lens barrel 122B. The second optical lens 112B is supported within the second lens barrel 122B to form the second optical lens module 102B for positioning adjustment.

During the assembling process of the first optical lens module 101B, the first optical lens 111B is supported within the first lens barrel 121B via a first positioning unit 1211B which is radially and inwardly extended from an inner barrel wall of the first lens barrel 121B. In particular, the first optical lens 111B is supported at the first positioning unit 1211B via the first adhering element 41B in a semi-solidified state, such that the relative position of the first optical lens 111B is adjustable within the first lens barrel 121B. According to the third embodiment, the first optical lens 111B is arranged for calibration during the calibrating process. In other words, the first optical lens 111B serves as one of the optical element to be calibrated optical elements to be calibrated. In addition, the aperture member 13B is coupled on the top edge of the first lens barrel 121B to form the first optical lens module 101B during the assembling process thereof.

In particular, the first lens barrel 121B has at least one calibration channel 1212B formed at a barrel wall of the first lens barrel 121B to communicate with an interior thereof, wherein the calibration channel 1212B is a through slot. In the third embodiment, there are three calibration channels 1212B evenly formed at the barrel wall of the first lens barrel 121B at a 120° interval with respect to a center thereof. In particular, the calibration channels 1212B are located corresponding to the location of the first optical lens 111B to enable the relative position of the first optical lens 111B to be calibrated through at least one of the calibration channels 1212B. For example, a probe can be slidably inserted into the calibration channel 1212B to contact and move the first optical lens 111B within the first lens barrel 121B, so as to adjust the relative position of the first optical lens 111B within the first lens barrel 121B in a horizontal direction and a vertical direction. Therefore, the calibration of the first optical lens 111B within the first lens barrel 121B can be completed.

During the pre-assembling process of the camera lens module, the third optical lens module 103B is affixed to the image sensor 20B. Then, the second optical lens module 102B is coupled at the third optical lens module 103B via the third adhering element 43B, and the first optical lens module 101B is coupled at the second optical lens module 102B via the second adhering element 42B. Accordingly, the second adhering element 42B and the third adhering element 43B are in a semi-solidified state under UV exposure. Therefore, the relative positions of the second optical lens module 102B and the first optical lens module 101B can be individually adjusted for calibration.

The relative positions of the first optical lens module 101B and the second optical lens module 102B are adjustable. Therefore, the first optical lens module 101B and the second optical lens module 102B are also the optical elements to be calibrated.

The camera lens module is electrified during the pre-assembling process for image acquisition, wherein the calibration measurement of each of the first optical lens module 101B, the second optical lens module 102B, and the first optical lens 111B is determined through the calibration software. Therefore, the relative positions of the first optical lens module 101B, the second optical lens module 102B, and the first optical lens 111B are individually adjusted with respect to the calibration measurements. It is worth mentioning that the image acquisition is required for every position adjustment of the first optical lens module 101B, the second optical lens module 102B, and the first optical lens 111B, such that each calibration of the camera lens module is based on the previous image acquisition. Once the calibration of the camera lens module is completed, the first adhering element 41B, the second adhering element 42B and the third adhering element 43B are solidified to permanently affix the assembling positions of the first optical lens module 101B, the second optical lens module 102B, and the first optical lens 111B.

It is worth mentioning that when the calibration of the first optical lens module 101B is completed, the calibration channel 1212B must be sealed. For example, a sealing glue can be injected into the calibration channel 1212B to seal the calibration channel 1212B and to secure the relative position of the first optical lens 111B as well. In addition, the sealing glue can be the above mentioned mixture glue, such that when the sealing glue is injected to seal the calibration channel 1212B, the sealing glue is solidified by the heat treatment at the same time when the first adhering element 41B is solidified to secure the relative position of the first optical lens 111B within the first lens barrel 121B. The second adhering element 42B and the third adhering element 43B are also solidified by the heat treatment to secure the relative positions of the first optical lens module 101B and the second optical lens module 102B.

Accordingly, the calibration process can be completed by serving the first optical lens module 101B as the optical element to be calibrated when the second optical lens module 102B and the third optical lens module 103B are combined as one module to be affixed to the lens base 22B. Alternatively, the first optical lens module 101B and the second optical lens module 102B are combined as one module to serve as the optical element to be calibrated, and then the third optical lens module 103B is affixed at the lens base 22B. Therefore, the calibration process can be completed by adjusting the assembling positions of the first optical lens module 101B, the second optical lens module 102B, and the first optical lens 111B.

It is worth mentioning that the first optical lens 111B can be pre-assembled. Alternatively, the second optical lens 112B can also be pre-assembled, and at least one of the third optical lens 113B and the fourth optical lens 114B can be pre-assembled. Each pre-assembled optical lens can be calibrated through the calibration process.

According to the third embodiment, the present invention further comprises a method of assembling the camera lens module with one or more optical lens modules, which comprises the following steps.

Step 801: Assemble the image sensor and pre-assemble one or more lens modules of the lens assembly.

Step 802: Pre-assemble at least one optical lens module with the image sensor to form the camera lens module in the pre-assembling state.

Step 803: Acquire the image signal through the optical lens module of the lens assembly.

Step 804: Determine a calibration measurement of the optical lens module and the optical lens of the lens assembly by means of a calibration software.

Step 805: Adjust the relative assembling positions of the optical lens module and the optical lens of the lens assembly in response to the calibration measurement.

Step 806: When the assembling positions of each of the optical lens modules and the optical lens are adjusted to obtain a desired resolution of the camera lens module, go to Step 807. Otherwise, repeat Step 803 to Step 805 until the desired resolution of the camera lens module is obtained.

Step 807: Solidify the mixture glue to permanently fix the optical lens module and the optical lens with the image sensor to form the camera lens module.

Accordingly, in the Step 801, in order to assemble the image sensor, at least one optical lens module is pre-assembled. In other words, the relative position of at least one optical lens in the optical lens module is arranged to be adjustable. In this embodiment, the first lens module 101B is the pre-assembled lens module, wherein the assembling position of the first optical lens 111B can be adjusted in at least one direction. In other words, the assembling position of the first optical lens 111B can be adjusted along at least one of the horizontal direction, vertical direction, inclination direction, and circumferential direction. In the third embodiment, the assembling position of the second optical lens 112B in the second optical lens module 102B and the assembling positions of the third optical lens 113B and the fourth optical lens 114B in the third optical lens module 103B are fixed and cannot be adjusted.

In the Step 802, the pre-assembling process of the optical lens module with the image sensor is that the third optical lens module 103B is permanently affixed to the lens base 22B. Then, the second optical lens module 102B is coupled to the third optical lens module 103B via the third adhering element 43B. The first optical lens module 101B is then coupled to the second optical lens module 102B via the second adhering element 42B. The second adhering element 42B and the third adhering element 43B are in semi-solidified state under UV exposure during the pre-assembling process, so as to allow the relative positioning adjustments of the first optical lens module 101B and the second optical lens module 102B for calibration.

Through the Step 803 to Step 805, the camera lens module in the pre-assembling state is electrified for image acquisition, wherein the calibration measurement of each of the first optical lens module 101B, the second optical lens module 102B, and the first optical lens 111B is determined through the calibration software. Therefore, the relative assembling positions of the first optical lens module 101B, the second optical lens module 102B, and the first optical lens 111B are individually adjusted with respect to the calibration measurements. The relative positions of the first optical lens module 101B, the second optical lens module 102B, and the first optical lens 111B can be selectively adjusted to align with a centerline of the lens assembly 10B so as to align with the centerline of the photosensitive chip 23B within the deviation range thereof for achieving the desired image quality of the camera lens module.

It is worth mentioning that the image acquisition is required for every position adjustment of the first optical lens module 101B, the second optical lens module 102B, and the first optical lens 111B. Once the calibration process is completed, the first adhering element 41B, the second adhering element 42B and the third adhering element 43B are heated and solidified to permanently affix the relative positions of the first optical lens module 101B, the second optical lens module 102B, and the first optical lens 111B.

Accordingly, the calibration order can be modified that one of the optical lens module and the optical lens can be selected to be calibrated initially and permanently affixed its relative position via the solidification of the mixture glue. Then, the rest of the pre-assembled components can be calibrated and affixed in sequence. In other words, the pre-assembled components are individually calibrated and affixed the relative position via the solidification of the mixture glue in sequence. It is appreciated that the pre-assembled components can be calibrated individually or together and then affixed the relative positions via the solidification of the mixture glue at the same time.

Figure 9:
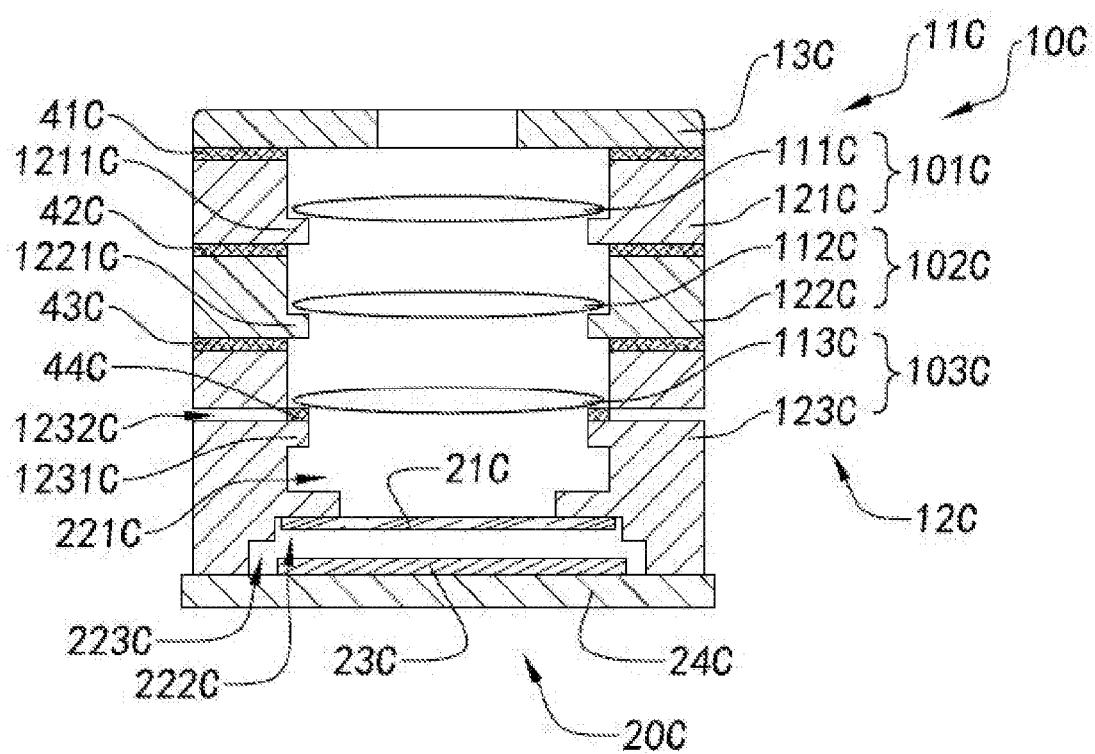
FIG. 9 is a sectional view of the camera lens module with one or more optical lens modules according to a fourth preferred embodiment of the present invention.
Figure 10:
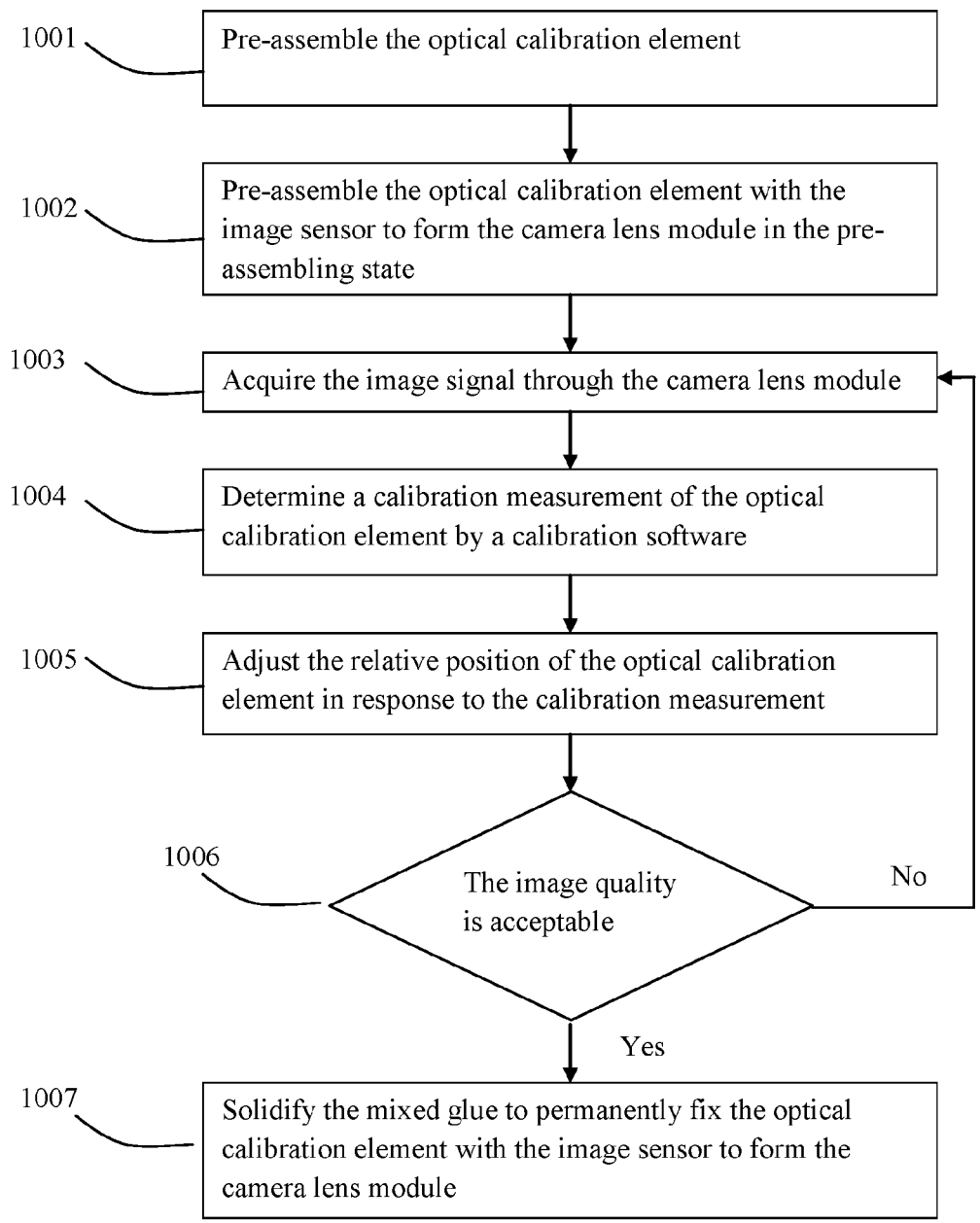
FIG. 10 is a flow diagram illustrating the assembling method of the camera lens module with one or more optical lens modules according to the above fourth preferred embodiment of the present invention.

As shown in FIGS. 9 to 10, a camera lens module according to a fourth embodiment illustrates an alternative mode of the first through third embodiments, wherein the camera lens module comprises a lens assembly 10C and an image sensor 20C, wherein the lens assembly 10C is located along a light path of the image sensor 20C, such that the image sensor 20C can pick up light incident through the lens assembly 10B and can convert the light into image signals. Accordingly, the relative position of the lens assembly 10C to the image sensor 20C is adjustable for achieving the desired image quality of the camera lens module.

The lens assembly 10C comprises an optical lens set 11C, a lens barrel set 12C, and an aperture member 13C. The optical lens set 11C comprises a first optical lens 111C, a second optical lens 112C, and a third optical lens 113C. The lens barrel set 12C comprises a first lens barrel 121C, a second lens barrel 122C, and a third lens barrel 123C. The aperture member 13C is coupled on a top edge of the first lens barrel 121C. The first optical lens 111C is supported within the first lens barrel 121C via a first positioning unit 1211C which is radially and inwardly extended from an inner barrel wall of the first lens barrel 121C. Accordingly, the first optical lens 111C is mounted in the first lens barrel 121C to form a first optical lens module 101C, wherein the first optical lens module 101C is located at the farther location of the camera lens module where the aperture member 13C is coupled at the top portion of the first optical lens module 101C. In particular, the assembling position of the aperture member 13C with respect to the first optical lens module 101C is adjustable in at least one direction. In other words, the assembling position of the aperture member 13C can be adjusted along at least one of the horizontal direction, vertical direction, inclination direction, and circumferential direction. The second optical lens 112C is supported within the second lens barrel 122C via a second positioning unit 1221C which is radially and inwardly extended from an inner barrel wall of the second lens barrel 122C. Accordingly, the second optical lens 112C is mounted in the second lens barrel 122C to form a second optical lens module 102C. The third optical lens 113C is supported within the third lens barrel 123C via a third positioning unit 1231C which is radially and inwardly extended from an inner barrel wall of the third lens barrel 123C. Accordingly, the third optical lens 113C is mounted in the third lens barrel 123C to form a third optical lens module 103C. It is worth mentioning that the assembling position of the third optical lens 113C with respect to the third lens barrel 123C is adjustable in at least one direction. In other words, the assembling position of the third optical lens 113C can be adjusted along at least one of the horizontal direction, vertical direction, inclination direction, and circumferential direction.

According to the fourth embodiment, the image sensor 20C comprises a color filter 21C, a lens base (i.e. the first lens barrel 123C), a photosensitive chip 23C, and a control circuit board 24C. The color filter 21C is coupled at the first lens barrel 123C at a position above the photosensitive chip 23C. In other words, the color filter 21C is provided along a photosensitive path of the photosensitive chip 23C. The photosensitive chip 23C is operatively coupled on top of the control circuit board 24C.

The third lens barrel 123C has a first holding groove 221C indently formed within an inner surrounding wall of the third lens barrel 123C, a second holding groove 222C indently formed within the inner surrounding wall of the third lens barrel 123C, and a third holding groove 223C indently formed within the inner surrounding wall of the third lens barrel 123C. The first holding groove 221C, the second holding groove 222C, and the third holding groove 223C are formed at the upper portion, mid-portion, and the lower portion of the third lens barrel 123C respectively. The color filter 21C is supported by the second holding groove 222C. The photosensitive chip 23C is supported by the third holding groove 223C and is operatively coupled on the top side of the control circuit board 24C. The control circuit board 24C is coupled at the bottom side of the third lens barrel 123C, wherein the photosensitive chip 23C picks up light incident from the lens assembly 10C and converts the light into image signals.

It is worth mentioning that the aperture member 13C is coupled at the first lens barrel 121C via the first adhering element 41C. The first optical lens module 101C is coupled at the second optical lens module 102C via the second adhering element 42C. The second optical lens module 102C is coupled at the third optical lens module 103C via the third adhering element 43C. The third optical lens 113C is supported within the third lens barrel 123C via the fourth adhering element 44C. According to the fourth embodiment, the aperture member 13C, the first optical lens module 101C, the second optical lens module 102C, the third optical lens module 103C, and the third optical lens 113C serve as the optical elements to be calibrated. Therefore, the relative assembling positions of the aperture member 13C, the first optical lens module 101C, the second optical lens module 102C, the third optical lens module 103C, and the third optical lens 113C are adjustable for calibration. In other words, through the first through fourth adhering elements 41C, 42C, 43C, 44C in a semi-solidified state under the UV exposure, the relative positions of the aperture member 13C, the first optical lens module 101C, the second optical lens module 102C, the third optical lens module 103C, and the third optical lens 113C are adjustable during the pre-assembling process. The first through fourth adhering elements 41C, 42C, 43C, 44C in a semi-solidified state will also able to initially hold the relative positions of the aperture member 13C, the first optical lens module 101C, the second optical lens module 102C, the third optical lens module 103C, and the third optical lens 113C to prevent any unwanted movement so as to simplify the calibration process.

According to the fourth embodiment, the present invention further comprises a method of assembling the camera lens module which comprises the following steps.

Step 1001: Pre-assemble the optical elements to be calibrated.

Step 1002: Pre-assemble the optical elements to be calibrated with the image sensor to form the camera lens module in the pre-assembling state.

Step 1003: Acquire the image signal through the camera lens module.

Step 1004: Determine a calibration measurement of the optical elements to be calibrated by a calibration software.

Step 1005: Adjust the relative positions of the optical elements to be calibrated with the image sensor in response to the calibration measurement.

Step 1006: When the relative positions of the optical elements to be calibrated are adjusted to obtain a desired resolution of the camera lens module, go to Step 1007. Otherwise, repeat Step 1003 to Step 1005 until the desired resolution of the camera lens module is obtained.

Step 1007: Solidify the mixture glue to permanently fix the optical elements to be optical elements to be calibrated with the image sensor to form the camera lens module.

In the Step 1001 and Step 1002, the optical elements to be calibrated include at least one of the optical lens and the aperture member, and at least one of the optical lens modules. In other words, at least one of the optical lens and the aperture member combines with one optical lens module to serve as the optical elements to be calibrated. The relative positions of the optical elements to be calibrated are adjustable to calibrate the camera lens module. According to the fourth embodiment, the third optical lens 113C, the aperture member 13C, the first optical lens module 101C, the second optical lens module 102C are the optical elements to be calibrated. The relative positions of the third optical lens 113C, the aperture member 13C, the first optical lens module 101C, the second optical lens module 102C are adjusted to align with a centerline of the lens assembly 10C so as to align with the centerline of the photosensitive chip 23C within the deviation range thereof for achieving the desired image quality of the camera lens module.

In the Step 1101, the assembling tolerance of the optical elements to be calibrated should be controlled for calibration later.

Through the Step 1003 to Step 1005, the camera lens module is electrified for image acquisition, wherein the calibration measurement of the optical elements to be calibrated is determined through the calibration software, such that the optical elements to be calibrated can be calibrated in response to the calibration measurement.

The calibration process of the optical elements to be calibrated comprises the following steps.

(1) The camera lens module is electrified for image acquisition, wherein the calibration measurement of the third optical lens 113C is determined through the calibration software, such that the third optical lens 113C can be calibrated in response to the calibration measurement. In other words, the assembling position of the third optical lens 113C is adjusted to align a centerline of the third optical lens 113C with the centerline of the photosensitive chip 23C within the deviation range thereof for achieving the desired image quality of the camera lens module. If the calibration of the third optical lens 113C cannot achieve the desired image quality, the calibration process of the third optical lens 113C will repeat until the desired image quality is achieved. The image acquisition is required for every position adjustment of the third optical lens 113C, such that each calibration of the third optical lens 113C is based on the previous image acquisition. Once the calibration of the third optical lens 113C is completed, the fourth adhering element 44C is solidified to permanently affix the assembling position of the third optical lens 113C.

(2) The camera lens module is electrified for image acquisition, wherein the calibration measurement of the second optical lens module 102C is determined through the calibration software, such that the second optical lens module 102C can be calibrated in response to the calibration measurement. In other words, the assembling position of the second optical lens module 102C is adjusted to align a centerline of the second optical lens module 102C with the centerline of the photosensitive chip 23C within the deviation range thereof for achieving the desired image quality of the camera lens module. If the calibration of the second optical lens module 102C cannot achieve the desired image quality, the calibration process of the second optical lens module 102C will repeat until the desired image quality is achieved. The image acquisition is required for every position adjustment of the second optical lens module 102C, such that each calibration of the second optical lens module 102C is based on the previous image acquisition. Once the calibration of the second optical lens module 102C is completed, the third adhering element 43C is solidified to permanently affix the assembling position of the second optical lens module 102C.

(3) The camera lens module is electrified for image acquisition, wherein the calibration measurement of the first optical lens module 101C is determined through the calibration software, such that the first optical lens module 101C can be calibrated in response to the calibration measurement. In other words, the assembling position of the first optical lens module 101C is adjusted to align a centerline of the first optical lens module 101C with the centerline of the photosensitive chip 23C within the deviation range thereof for achieving the desired image quality of the camera lens module. If the calibration of the first optical lens module 101C cannot achieve the desired image quality, the calibration process of the first optical lens module 101C will repeat until the desired image quality is achieved. The image acquisition is required for every position adjustment of the first optical lens module 101C, such that each calibration of the first optical lens module 101C is based on the previous image acquisition. Once the calibration of the first optical lens module 101C is completed, the second adhering element 42C is solidified to permanently affix the assembling position of the first optical lens module 101C.

(4) The camera lens module is electrified for image acquisition, wherein the calibration measurement of the aperture member 13C is determined through the calibration software, such that the aperture member 13C can be calibrated in response to the calibration measurement. In other words, the assembling position of the aperture member 13C is adjusted to align a centerline of the aperture member 13C with the centerline of the photosensitive chip 23C within the deviation range thereof for achieving the desired image quality of the camera lens module. If the calibration of the aperture member 13C cannot achieve the desired image quality, the calibration process of the aperture member 13C will repeat until the desired image quality is achieved. The image acquisition is required for every position adjustment of the aperture member 13C, such that each calibration of the aperture member 13C is based on the previous image acquisition. Once the calibration of the aperture member 13C is completed, the first adhering element 41C is solidified to permanently affix the assembling position of the aperture member 13C.

After the calibrations, the relative assembling positions of the third optical lens 113C, the aperture member 13C, the first optical lens module 101C, the second optical lens module 102C are permanently fixed to form the camera lens module.

Each of the first adhering element 41C, the second adhering element 42C, the third adhering element 43C, and the fourth adhering element 44C is preferably a mixture glue comprising UV glue mixed with thermosetting adhesive, wherein the mixture glue is in a semi-solidified state under the UV exposure and is solidified after heat treatment, such as within an oven. Therefore, before the solidification of the mixture glue, the assembling positions of the optical elements to be calibrated can be adjusted.

It is worth mentioning that the calibration software is used for calibrating the relative positions of the third optical lens 113C, the aperture member 13C, the first optical lens module 101C, the second optical lens module 102C based on the sensitivity of the optical lens. Accordingly, the calibration process of the third optical lens 113C, the aperture member 13C, the first optical lens module 101C, the second optical lens module 102C comprises the following steps. Measure the optical characteristics of the camera lens module prior to the calibration, including light eccentricity measurement, light axis inclination angle, and curvature of field. In response to the light eccentricity measurement, light axis inclination angle, and curvature of field corresponding to the relative positions of the third optical lens 113C, the aperture member 13C, the first optical lens module 101C, the second optical lens module 102C, determine the calibration measurements of the third optical lens 113C, the aperture member 13C, the first optical lens module 101C, the second optical lens module 102C.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A camera lens module, comprising:
   an image sensor having a photosensitive path;
   a lens assembly which is coupled to said image sensor along said photosensitive path and comprises two or more optical lens modules and an aperture member coupled at a top portion of one of said optical lens modules, wherein each of said optical lens modules comprises a lens barrel and at least an optical lens supported within said lens barrel, wherein an assembling position of each of said optical lens modules with respect to a position of said image sensor is arranged to be adjustable for calibration and said assembling positions of said optical lens modules are permanently fixed after calibration, wherein said assembling positions of said aperture member and said optical lens modules are arranged to be adjustable with respect to each other and said position of said image sensor for calibration during assembling thereof; and
   an adhering element formed in a semi-solidified state under UV exposure and being solidified after heat treatment, wherein said optical lens modules are coupled with each other, said aperture member is coupled with said respective optical lens module, and said optical lens module is coupled at said image sensor by said adhering element, such that said assembling positions of said optical lens modules and said aperture member with respect to said position of said image sensor are adjustable for calibration when said adhering element is in a semi-solidified state and said assembling positions of said optical lens modules and said aperture member with respect to said position of said image sensor are permanently fixed after calibration when said adhering element is solidified.

2. The camera lens module, as recited in claim 1, wherein said image sensor comprises a photosensitive chip and a lens base coupled to said optical lens modules and supported said photosensitive chip in said lens base, wherein said assembling positions of said optical lens modules are adjusted to align a centerline of said lens assembly with a centerline of said photosensitive chip for calibration, such that said assembling positions of said optical lens modules are permanently fixed after said centerline of said lens assembly are adjusted to align with the centerline of said photosensitive chip.

3. The camera lens module, as recited in claim 2, wherein said relative position of said optical lens module is adjustable at six axes thereof.

4. The camera lens module, as recited in claim 2, said lens barrel has a calibration channel formed at a barrel wall of said lens barrel to communicate an interior of said lens barrel with outside and is aligned with respect to said optical lens pre-assembled within said lens barrel, such that said assembling position of said optical lens within said lens barrel is able to be adjusted through said calibration channel for calibration during assembling of said camera lens module.

5. The camera lens module, as recited in claim 1, said lens barrel has a calibration channel formed at a barrel wall of said lens barrel to communicate an interior of said lens barrel with outside and is aligned with respect to said optical lens pre-assembled within said lens barrel, such that said assembling position of said optical lens within said lens barrel is able to be adjusted through said calibration channel for calibration during assembling of said camera lens module.

6. A method of manufacturing a camera lens module, comprising the steps of:
   (a) assembling an image sensor having a photosensitive path;
   (b) pre-assembling a lens assembly, wherein said lens assembly comprises one or more optical lens modules and an aperture member coupled at said optical lens module, wherein said optical lens module comprises a lens barrel and at least an optical lens supported within said lens barrel, wherein said optical lens module is coupled at said image sensor and said aperture member is coupled at said optical lens module by an adhering element which is formed in a semi-solidified state under UV exposure and being solidified after heat treatment;
   (c) adjusting assembling positions of said optical lens modules and said aperture member with respect to said image sensor for calibration, such that said assembling positions of said aperture member and said optical lens module are adjustable for calibration when said adhering element is in said semi-solidified state; and
   (d) permanently fixing said assembling position of said lens assembly to said image sensor after calibration, wherein said assembling positions of said aperture member and said optical lens module are permanently fixed after calibration when said adhering element is solidified.

7. The method, as recited in claim 6, wherein said lens barrel of said optical lens module comprises a calibrating channel provided at a barrel wall of said lens barrel for communicating an interior of said lens barrel with outside, and the step (c) further comprises a step of adjusting an assembling position of said optical lens within said lens barrel with respect to said image sensor through said calibrating channel.

8. The method, as recited in claim 7, wherein the step (c) further comprises the steps of:
- (c.1) acquiring an image signal through said lens assembly;
- (c.2) determining a calibration measurement of said lens assembly by a calibration software;
- (c.3) adjusting said assembling position of said lens assembly in response to said calibration measurement;
- (c.4) when a desired image quality of said lens assembly is unacceptable after said assembling position of said lens assembly is adjusted and calibrated, repeating the step (c.1) to the step (c.3) to re-calibrate said lens assembly; and
- (c.5) when the desired image quality of said lens assembly is acceptable after said assembling position of said lens assembly is adjusted and calibrated, said assembling position of said lens assembly is permanently fixed in the step (d).

9. The method, as recited in claim 6, wherein the step (c) further comprises the steps of:
- (c.1) acquiring an image signal through said lens assembly;
- (c.2) determining a calibration measurement of said lens assembly by a calibration software;
- (c.3) adjusting said assembling position of said lens assembly in response to said calibration measurement;
- (c.4) when a desired image quality of said lens assembly is unacceptable after said assembling position of said lens assembly is adjusted and calibrated, repeating the step (c.1) to the step (c.3) to re-calibrate said lens assembly; and
- (c.5) when the desired image quality of said lens assembly is acceptable after said assembling position of said lens assembly is adjusted and calibrated, said assembling position of said lens assembly is permanently fixed in the step (d).

10. A method of manufacturing a camera lens module, comprising the steps of:
- (a) assembling an image sensor having a photosensitive path;
- (b) pre-assembling a lens assembly, wherein said lens assembly comprises two or more optical lens modules coaxially coupled with each other and an aperture member coupled with one of said optical lens modules by an adhering element which is formed in a semi-solidified state under UV exposure and being solidified after heat treatment, wherein each of said optical lens modules comprises a lens barrel and at least an optical lens supported within said lens barrel;
- (c) adjusting assembling positions of said optical lens modules and said aperture member with respect to said image sensor for calibration, such that assembling positions of one of said optical lens modules with respect to another one of said optical lens modules and an assembling position of said aperture member are adjustable for calibration when said adhering element is in said semi-solidified state; and
- (d) permanently fixing said assembling position of said lens assembly to said image sensor after calibration, such that said assembling positions of said aperture member and said optical lens modules are permanently fixed after calibration when said adhering element is solidified.

11. The method, as recited in claim 10, wherein said lens barrel of each of said optical lens modules comprises a calibrating channel provided at a barrel wall of said lens barrel for communicating an interior of said lens barrel with outside, and the step (c) further comprises a step of adjusting an assembling position of said optical lens within said lens barrel with respect to said image sensor through said calibrating channel.

12. The method, as recited in claim 11, wherein the step (c) further comprises the steps of:
- (c.1) acquiring an image signal through said lens assembly;
- (c.2) determining a calibration measurement of said lens assembly by a calibration software;
- (c.3) adjusting said assembling position of said lens assembly in response to said calibration measurement;
- (c.4) when a desired image quality of said lens assembly is unacceptable after said assembling position of said lens assembly is adjusted and calibrated, repeating the step (c.1) to the step (c.3) to re-calibrate said lens assembly; and
- (c.5) when the desired image quality of said lens assembly is acceptable after said assembling position of said lens assembly is adjusted and calibrated, said assembling position of said lens assembly is permanently fixed in the step (d).

* * * * *